(12) United States Patent
Hardman et al.

(10) Patent No.: US 12,531,750 B2
(45) Date of Patent: Jan. 20, 2026

(54) METHOD AND SYSTEM FOR VALIDATING TRANSFERRING DATA BETWEEN COMMUNICATION DEVICES

(71) Applicant: SICPA HOLDING SA, Prilly (CH)

(72) Inventors: Daniel Hardman, St. Légier-la-Chiésaz (CH); Bart Suichies, St. Légier-la-Chiésaz (CH); Kalin Nicolov, Prilly (CH)

(73) Assignee: SICPA HOLDING SA, Prilly (CH)

( * ) Notice: Subject to any disclaimer, the term of this patent is extended or adjusted under 35 U.S.C. 154(b) by 86 days.

(21) Appl. No.: 18/723,784

(22) PCT Filed: Dec. 16, 2022

(86) PCT No.: PCT/EP2022/086373
§ 371 (c)(1),
(2) Date: Jun. 24, 2024

(87) PCT Pub. No.: WO2023/117766
PCT Pub. Date: Jun. 29, 2023

(65) Prior Publication Data
US 2025/0070983 A1    Feb. 27, 2025

(30) Foreign Application Priority Data

Dec. 22, 2021   (EP) .................................. 21217192

(51) Int. Cl.
*G06F 21/62* (2013.01)
*H04L 9/00* (2022.01)
(Continued)

(52) U.S. Cl.
CPC ........ *H04L 9/3247* (2013.01); *G06F 21/6209* (2013.01); *H04L 9/50* (2022.05);
(Continued)

(58) Field of Classification Search
CPC ..... H04L 9/3247; H04L 9/50; G06F 21/6209; G06Q 20/223; G06Q 20/3678; G06Q 2220/00
See application file for complete search history.

(56) References Cited

U.S. PATENT DOCUMENTS

2004/0181756 A1* 9/2004 Berringer ................ G06F 21/64
713/176
2008/0155263 A1* 6/2008 Mergen ................ H04L 9/3247
713/176

(Continued)

FOREIGN PATENT DOCUMENTS

WO    2020257597    12/2020

OTHER PUBLICATIONS

Cryptographic Accumulators: Definitions, Constructions and Applications, Nelly Fazio and Antonio Nicolosi, G22.3033-010—Topics in Cryptography, Instructor: Prof. Victor Shoup, Term: Fall 2002, 23 pages.

(Continued)

*Primary Examiner* — David J Pearson
(74) *Attorney, Agent, or Firm* — MUNCY, GEISSLER, OLDS & LOWE, P.C.

(57) ABSTRACT

The present invention relates to the technical field of the transfer of data, such as, for example, between Internet of Things (IoT) devices. Particularly, the invention relates to the technical field of the transfer of data between a first and a second communication devices in an untrusted environment.

15 Claims, 5 Drawing Sheets

(51) Int. Cl.
*H04L 9/32* (2006.01)
*G06Q 20/22* (2012.01)
*G06Q 20/36* (2012.01)

(52) U.S. Cl.
CPC ....... *G06Q 20/223* (2013.01); *G06Q 20/3678* (2013.01); *G06Q 2220/00* (2013.01)

(56) References Cited

U.S. PATENT DOCUMENTS

| | | | |
|---|---|---|---|
| 2016/0253663 A1* | 9/2016 | Clark | G06Q 20/341 |
| | | | 705/75 |
| 2018/0034642 A1* | 2/2018 | Kaehler | H04L 9/14 |
| 2019/0188720 A1* | 6/2019 | Williams | G06Q 20/4016 |
| 2020/0145192 A1 | 5/2020 | Elkhiyaoui et al. | |
| 2020/0162252 A1* | 5/2020 | Davis | H04L 9/0872 |
| 2021/0281425 A1 | 9/2021 | Kaehler | |
| 2022/0108312 A1 | 4/2022 | Makrides | |
| 2022/0374884 A1* | 11/2022 | Wai | G06Q 50/16 |
| 2023/0316272 A1* | 10/2023 | Zhang | G06Q 20/065 |
| | | | 705/75 |
| 2024/0073039 A1* | 2/2024 | De Feo | H04L 9/3297 |

OTHER PUBLICATIONS

International Search Report and Written Opinion issued with respect to Application No. PCT/EP2022/086373.

* cited by examiner

METHOD AND SYSTEM FOR VALIDATING TRANSFERRING DATA BETWEEN COMMUNICATION DEVICES

TECHNICAL FIELD

The present invention relates to the technical field of the transfer of data, such as, for example, between Internet of Things (IoT) devices. Particularly, the invention relates to the technical field of the transfer of data between a first and a second communication devices in an untrusted environment in a way that provably commits each device to the fact that the transfer of data has occurred.

BACKGROUND OF THE INVENTION

The problems of counterfeiting and tampering with digital data are well known and are growing every day.

Regarding the industrial field, the digitalization of several processes usually is highly vulnerable to cyber-attacks. When a computer talks with another one, the security protocols in place are barely enough against the hackers' techniques. In particular, defending moving data from external attackers is not easy—but defending it from those who have a legitimate role inside its exchange is even harder. The traditional answer—to centralize oversight in a global oracle—doesn't scale well, and it may be incompatible with technical requirements as well as with mixed legal jurisdictions and with privacy ideals. Additionally, there are so many industries, so many protocols for computer to communicate between each other, that the solutions of the prior art regarding these problems are very hard to implement, cost a lot of money, and must be adapted depending on each situation. Therefore, there is an urgent need for a decentralized solution to ensure the integrity of data transfers between communication devices in an untrusted environment, for example where several communications devices have to exchange data. At the same time, it is necessary to find a low-cost solution that can be easily and quickly implemented.

Indeed, today, how can a computer or a robot or an IoT device be sure that the data received from another device comes with proper guarantees of authenticity and authorized transfer?

How can a computer or a robot be sure that the party, for example a computer or a robot, sending these data is the right one and that these data are genuine and appropriate to the circumstances?

Usually, these kinds of problems are solved using a plurality of databases stored in several servers and these servers receive requests from a device asking them if said other device or said data are valid or certified or genuine.

These kinds of solutions have serious limitations such as for example the need to have an online environment, i.e. a communication network between the device and at least one server, also called an oracle. What happens in an offline environment when the device cannot communicate with the oracle? Or even more complicated, how to avoid the overloading of bandwidth that creates a lag in the execution of such solutions?

It is therefore an object of the invention to solve at least partially some of these technical problems.

SUMMARY OF THE INVENTION

According to one aspect, the present invention relates to a system for transferring at least a set of data between at least a first communication device and a second communication device using at least a qualification device that approves the transfer of data and attests its validity.

According to an aspect, the present invention relates to a system for transferring at least a set of data, preferably the data to be transferred, between at least a first communication device and a second communication device of at least a plurality of communication devices using at least a qualification device, the system comprising a first communication device, a second communication device and a qualification device, and wherein:

a. each communication device of the plurality of communication devices comprises:
   i) an authentication unit configured to enable authentication of at least a qualification device and at least another communication device of the plurality of communication devices; and
   ii) a communication unit configured to:
      (1) enable a communication with at least a previous qualification device through at least one communication network, preferably through at least a short-range communication network; and
      (2) enable a communication with at least the qualification device through at least one communication network, preferably through at least a short-range communication network, and
      (3) enable a communication with at least said another communication device of the plurality of communication devices; and
   iii) a processing unit configured to
      (1) generate at least one receipt, preferably with a format capable of holding at least three signatures, advantageously having at least one or two signature values in its data; and
      (2) digitally sign at least one receipt; and
      (3) preferably, generate at least one challenge to authenticate at least said qualification device, and preferably at least said another communication device of the plurality of communication devices; and
      (4) preferably, respond to a challenge from at least the qualification device and from at least said another communication device of the plurality of communication devices; and
      (5) preferably, evaluate the authenticity of at least one response to an authentication challenge; and
   iv) a storage unit configured to store at least
      (1) a list of data; and
      (2) a set of data; and
      (3) one previous receipt, at least triply signed, related to a previous data transfer; and
      (4) updating data received from said previous qualification device during at least a previous data transfer and configured to be downloaded by at least the qualification device during at least a data transfer; and
b. the qualification device comprises:
   i) at least two configurations:
      (1) an online configuration wherein the qualification device is configured to communicate with at least a qualification server and/or with at least another qualification device through at least another communication network, preferably through at least a long-range communication network; and
      (2) an offline configuration wherein the qualification device is configured to avoid communication with at least said qualification server and/or with said another qualification device through at least said another communication network, preferably through at least a long-range communication network, and ii) an authentication unit configured to enable authentication of at least a first communication device and a second communication device, and to enable authentication of at least said another qualification device; and iii) a communication unit configured to:
  (1) enable a communication with at least said first communication device and said second communication device through at least said communication network, preferably through at least a short-range communication network, when the qualification device is in its online configuration and when the qualification device is in its offline configuration; and
  (2) enable a communication with at least said qualification server and/or with at least said another qualification device through at least said another communication network, preferably through at least a long-range communication network, when the qualification device is in its online configuration; and iv) a qualification unit configured to qualify at least one among data to be transferred, communication devices and a data transfer; and v) a storage unit configured to store at least:
  (1) updating data being configured to update said qualification unit; and vi) a processing unit configured to:
  (1) preferably, generate at least one response to at least one challenge; and
  (2) preferably, generate at least one challenge to authenticate other qualification devices and/or at least one communication device; and
  (3) preferably, respond to an authentication challenge, and
  (4) preferably, evaluate the authenticity of at least one response to an authentic challenge; and
  (5) update the qualification unit using updating data; and
  (6) verify the consistency of receipts, preferably of at least doubly signed receipts; and
  (7) qualify at least one among a first communication device and a second communication device, data to be transferred or a data transfer; and
  (8) digitally sign at least one new receipt, forming a new at least triply signed receipt configured to be at least triply signed; and
  (9) generate at least new updating data based on at least a data transfer between the first communication device and the second communication device, said updating data being configured to update a qualification unit of at least another qualification device; and
  (10) insert a reference of said new updating data in said new receipt; and
  (11) send to the first communication device and to the second communication device at least said new at least triply signed receipt and new updating data;

c. and wherein said new at least triply signed receipt comprises:
  i) a digital signature of a first communication device; and
  ii) a digital signature of a second communication device; and
  iii) a digital signature of a qualification device; and
  iv) data related to, preferably a reference to or the actual bytes of, digitally signed updating data, said digitally signed updating data being signed by said qualification device;

and wherein:
d. the first communication device, the second communication device and the qualification device are configured to authenticate each other;
e. at least one among the first communication device and the second qualification device is configured to send to the qualification device at least
  i) a list of data related to a set of data to be transferred from the first communication device to the second communication device; and
  ii) preferably, a first at least triply signed receipt comprising:
    (1) a digital signature of the first communication device; and
    (2) a digital signature of another communication device; and
    (3) a digital signature of a previous qualification device; and
    (4) digitally signed updating data, said updating data being digitally signed by the previous qualification device; and
  iii) updating data, said updating data coming from the previous qualification device, said updating data being configured to update the qualification unit of the qualification device; and
f. the qualification device is configured to use the updating data to update its qualification unit; and
g. the qualification device is configured to validate said data transfer by validating, using its qualification unit, at least one among the data to be transferred, the first communication device and the second communication device, and
h. the qualification device is configured to authorize the transfer of data from the first communication device to the second communication device, if the qualification unit validates said data transfer; and
i. preferably, the qualification device is configured to send a confirmation of validation to the first communication device to send said set of data to the second communication device; and
j. preferably, the qualification device is configured to send a confirmation of validation to the second communication device to receive said set of data from the first communication device; and
k. the first communication device is configured to send said set of data to the second communication device, preferably directly and/or using the qualification device as a relay; and
l. the second communication device is configured to receive and to verify said set of data related to said list of data sent from the first communication device; and
m. at least one among the first communication device and the second communication device is configured to generate a new receipt configured to be at least triply signed, to digitally sign it, and to send it to the other communication device among the first communication device and the second communication device; and
n. said other communication device among the first communication device and the second communication device is configured to receive said new receipt, to verify it, to digitally sign it, and to send it to the qualification device; and o. the qualification device is configured to receive said new receipt and to verify it; and p. the qualification device is configured to generate new updating data, to sign these new updating data, to insert a reference of said new updating data in said new receipt; and q. the qualification device is configured to send said new updating data to the first communication device and to the second communication device; and r. the qualification device is configured to digitally sign the new receipt, said receipt being at least triply signed, and to send it to the first communication device and to the second communication device; and s. said new at least triply signed receipt comprising:
  i) a digital signature of the first communication device; and
  ii) a digital signature of the second communication device; and
  iii) a digital signature of the qualification device; and
  iv) data related to, preferably a reference to or the actual bytes of, digitally signed new updating data, said new updating data being digitally signed by the qualification device and being configured to update the qualification unit of another qualification device.

The present invention allows the transfer of data in an untrusted environment between a first communication device and a second communication device using a qualification device to qualify said data transfer, bringing trust in said untrusted environment.

According to another aspect, the present invention relates to a communication device for transferring data to another communication device using a first qualification device and a second qualification device, said communication device comprising a. an authentication unit configured to enable authentication of at least said second qualification device and at least said another communication device; and b. a communication unit configured to:
  i) enable a communication with at least said first qualification device through at least one communication network, preferably through at least a short-range communication network; and
  ii) enable a communication with at least said second qualification device through at least one communication network, preferably through at least a short-range communication network; and
  iii) enable a communication with at least said another communication device; and c. a processing unit configured to:
  i) generate at least a new receipt, preferably with a format capable of holding three signatures, advantageously having only one or two signature values in its data; and
  ii) digitally sign at least one receipt; and
  iii) preferably, generate at least one challenge to authenticate at least said qualification device, and preferably at least another communication device; and
  iv) preferably, respond to a challenge from at least one qualification device and one other communication device; and
  v) preferably, evaluate the authenticity of at least one response to an authentication challenge; and d. a storage unit configured to store at least:
  i) a list of data; and
  ii) a set of data; and
  iii) one previous receipt, at least triply signed, related to a previous data transfer; and
  iv) updating data received from the first qualification device during at least a previous data transfer and configured to be downloaded by at least the second qualification device during at least a data transfer; and and wherein the communication device is configured to:

e. authenticate said another communication device and said second qualification device; and f. preferably, receive at least one request from said another communication device to prepare for transfer of data through the communication network; and g. preferably, send at least one request to said another communication device to prepare for transfer of data through the communication network; and h. submit to said second qualification device at least:
  i) a list of data related to a set of data to be transferred from the communication device to said another communication device and/or from said another communication device to the communication device; and
  ii) preferably, a first at least triply signed receipt comprising:
    (1) a digital signature of the first communication device; and
    (2) a digital signature of another communication device; and
    (3) a digital signature of a previous qualification device; and
    (4) digitally signed updating data, said updating data being digitally signed by the previous qualification device; and
  iii) updating data, said updating data coming from said first qualification device, said updating data being configured to update the second qualification device; and i. be qualified by at least said second qualification device, and j. preferably, receive from the second qualification device at least one confirmation of validation to send said set of data to said another communication device; and k. send to said another communication device said set of data and/or receive from said another communication device said set of data; and l. generate a new receipt configured to be at least triply signed, to digitally sign it, and to send it to said another communication device; and m. receive from said second qualification device said new receipt digitally signed by said second qualification device and preferably by said another communication device, said new receipt being a new at least triply signed receipt, and n. receive from said second qualification device new updating data being configured to update another qualification device;

and wherein said new at least triply signed receipt comprises:
  i) a digital signature of the communication device; and
  ii) a digital signature of said another communication device; and
  iii) a digital signature of said second qualification device; and iv) data related to, preferably a reference to or the actual bytes of, digitally signed new updating data, said new updating data being digitally signed by said second qualification device.

According to another aspect, the present invention relates to a qualification device configured to validate a transfer of data between at least a first communication device and a second communication device, and comprising.
 a. at least two configurations:
  i) an online configuration wherein the qualification device is configured to communicate with at least a qualification server and/or with at least one another qualification device through at least a communication network, preferably through at least a long-range communication network; and
  ii) an offline configuration wherein the qualification device is configured to avoid communication with at least said qualification server and/or said with at least another qualification device through at least said communication network, preferably through at least a long-range communication network; and
 b. an authentication unit configured to enable authentication of at least a first communication device and a second communication device and to enable authentication of at least said another qualification device and/or at least said qualification server; and
 c. a communication unit configured to:
  i) enable a communication with at least said first communication device and said second communication device through at least a communication network, preferably through at least a short-range communication network, when the qualification device is in its online configuration and/or when the qualification device is in its offline configuration; and
  ii) enable a communication with at least said qualification server and/or with at least said another qualification device through at least another communication network, preferably through at least a long-range communication network, when the qualification device is in its online configuration;
 d. a qualification unit configured to qualify at least one among the data to be transferred, the first communication device and the second communication device, and the data transfer; and
 e. a storage unit configured to store at least:
  i) updating data being configured to update said qualification unit; and
 f. a processing unit configured to:
  i) preferably, generate at least one response to at least one challenge; and
  ii) preferably, generate at least one challenge to authenticate other qualification devices and/or at least one communication device; and
  iii) preferably, respond to an authentication challenge; and
  iv) preferably, evaluate the authenticity of at least one response to an authentic challenge, and
  v) update the qualification unit using updating data; and
  vi) verify the consistency of receipts, preferably of at least doubly signed receipts; and
  vii) qualify at least one among the first communication device and the second communication device, the data to be transferred and the data transfer; and
  viii) digitally sign at least one new receipt, preferably forming a new receipt at least triply signed; and
  ix) generate at least new updating data based on at least a data transfer between the first communication device and the second communication device, said updating data being configured to update a qualification unit of at least another qualification device; and
  x) insert a reference of said new updating data in said new receipt, and
  xi) send to the first communication device and to the second communication device at least said new at least triply signed receipt and new updating data;
Said qualification device being configured to:
 g. authenticate at least the first communication device and the second communication device, and preferably at least another qualification device and/or at least a qualification server;
 h. receive, from at least one among the first communication device and the second communication device, at least:
  i) a list of data related to a set of data to be transferred from the first communication device to the second communication device and/or a list of data related to a set of data to be transferred from the second communication device to the first communication device.
  ii) preferably, a first at least triply signed receipt comprising.
   (1) a digital signature of the first communication device; and
   (2) a digital signature of another communication device; and
   (3) a digital signature of a previous qualification device; and
   (4) digitally signed updating data, said updating data being digitally signed by the previous qualification device; and;
  iii) updating data, said updating data coming from a previous qualification device, said updating data being configured to update the qualification unit of the qualification device; and
 i. use the updating data to update its qualification unit; and
 j. validate said data transfer by validating, using its qualification unit, at least one among the data to be transferred, the first communication device and the second communication device; and
 k. authorize the transfer of data from the first communication device to the second communication device and/or from the second communication device to the first communication device, if the qualification unit validates said data transfer; and
 l. preferably, send a confirmation of validation to the first communication device to send said set of data to the second communication device; and
 m. preferably, send a confirmation of validation to the second communication device to receive said set of data from the first communication device; and
 n. preferably, relay the set of data coming from the first communication device to the second communication device, and
 o. receive a new receipt, configured to be triply signed, from at least one among the first communication device and the second communication device; and
 p. verify the new receipt and, if said new receipt comprises a digital signature of the first communication device and a digital signature of the second communication device, to generate new updating data based on at least a data transfer between the first communication device and the second communication device, to sign said new updating data and to insert a reference of said new updating data in said new receipt; and q. send said new updating data to the first communication device and to the second communication device; and r. digitally sign the new receipt forming a new at least triply signed receipt, and to send it to the first communication device and to the second communication device; and s. preferably, store the new at least triply signed receipt and said updating data in its storage unit; said new at least triply signed receipt comprising:
  i) a digital signature of the first communication device; and
  ii) a digital signature of the second communication device; and
  iii) a digital signature of the qualification device; and
  iv) data related to, preferably a reference to or the actual bytes of, digitally signed new updating data, said new updating data being digitally signed by the qualification device and being configured to update the qualification unit of another qualification device.

According to another aspect, the present invention relates to a method for transferring at least a set of data between at least a first communication device and a second communication device taken among a plurality of communication devices using at least a first qualification device and a second qualification device taken among a plurality of qualification devices, wherein:

a. each communication device of the plurality of communication devices comprises:
  i) an authentication unit configured to enable authentication of at least a first qualification device, a second qualification device and at least another communication device of the plurality of communication devices; and
  ii) a communication unit configured to:
    (1) enable a communication with at least said first qualification device through at least one communication network, preferably through at least a short-range communication network, and
    (2) enable a communication with at least said second qualification device through at least one communication network, preferably through at least a short-range communication network; and
    (3) enable a communication with at least another communication device of the plurality of communication devices; and
  iii) a processing unit configured to:
    (1) generate at least one receipt, preferably with a format capable of holding three signatures, advantageously having only one or two signature values in its data; and
    (2) digitally sign at least one receipt; and
    (3) preferably, generate at least one challenge to authenticate at least said second qualification device, and preferably said first qualification device, and advantageously at least another communication device of the plurality of communication devices; and
    (4) preferably, respond to a challenge from at least one qualification device and/or from one other communication device of the plurality of communication devices; and
    (5) preferably, evaluate the authenticity of at least one response to an authentication challenge; and
  iv) a storage unit configured to store at least:
    (1) a list of data; and
    (2) a set of data; and
    (3) one previous receipt, at least triply signed, related to a previous data transfer, and
    (4) updating data received from said first qualification device during at least a previous data transfer and configured to be downloaded by at least said second qualification device during at least a data transfer; and b. each qualification device of the plurality of qualification devices comprises:
  i) at least two configurations:
    (1) an online configuration wherein the qualification device is configured to communicate with at least a qualification server and/or with at least one another qualification device through at least another communication network, preferably through at least a long-range communication network; and
    (2) an offline configuration wherein the qualification device is configured to avoid communication with at least said qualification server and/or with at least said another qualification device through at least another communication network, preferably through at least a long-range communication network; and
  ii) an authentication unit configured to enable authentication of at least a first communication device and a second communication device, and to enable authentication of at least said another qualification device; and
  iii) a communication unit configured to:
    (1) enable a communication with at least said first communication device and said second communication device through at least said communication network, preferably through at least a short-range communication network, when the qualification device is in its online configuration and when the qualification device is in its offline configuration; and
    (2) enable a communication with at least said qualification server and/or with at least said another qualification device through at least said communication network, preferably through at least a long-range communication network, when the qualification device is in its online configuration; and
  iv) a qualification unit configured to qualify at least one among the data to be transferred, the communication devices and data transfers; and
  v) a storage unit configured to store at least:
    (1) updating data being configured to update said qualification unit; and
  vi) a processing unit configured to:
    (1) preferably, generate at least one response to at least one challenge;
    (2) preferably, generate at least one challenge to authenticate other qualification devices and/or at least one communication device of the plurality of communication devices; and
    (3) preferably, respond to an authentication challenge; and
    (4) preferably, evaluate the authenticity of at least one response to an authentic challenge;
    (5) update the qualification unit using updating data; and
    (6) verify the consistency of receipts, preferably of at least doubly signed receipts;

(7) qualify at least one among the first communication device and the second communication device, data to be transferred and the data transfer; and (8) digitally sign at least one new receipt forming a new at least triply signed receipt; and (9) generate at least new updating data based on at least a data transfer between the first communication device and the second communication device, said updating data being configured to update a qualification unit of at least another qualification device; and

(10) insert a reference of said new updating data in said new receipt, and

(11) send to the first communication device and to the second communication device at least said new at least triply signed receipt and new updating data;

and wherein said new at least triply signed receipt comprises:

i) a digital signature of a first communication device;

ii) a digital signature of a second communication device;

iii) a digital signature of a qualification device;

iv) data related to, preferably a reference to or the actual bytes of, digitally signed updating data, said digitally signed updating data being signed by said qualification device;

and wherein:

c. the first communication device, the second communication device and the second qualification device authenticate each other;

d. at least one among the first communication device and the second communication device sends to the second qualification device at least:

i) a list of data related to a set of data to be transferred from the first communication device to the second communication device; and ii) preferably, a first at least a triply signed receipt comprising:

(1) a digital signature of the first communication device; and (2) a digital signature of another communication device; and (3) a digital signature of the first qualification device; and (4) digitally signed updating data, said updating data being digitally signed by the first qualification device; and iii) updating data, said updating data coming from the first qualification device, said updating data being configured to update the qualification unit of the second qualification device; and e. the second qualification device uses the updating data to update its qualification unit; and f. the second qualification device validates said data transfer by validating, using its qualification unit, at least one among the data to be transferred, the first communication device and the second communication device; and g. the second qualification device authorizes the transfer of data from the first communication device to the second communication device, if the qualification unit validates said data transfer; and h. preferably, the qualification device sends a confirmation of validation to the first communication device to send said set of data to the second communication device; and i. preferably, the qualification device sends a confirmation of validation to the second communication device to receive said set of data from the first communication device; and j. the first communication device sends said set of data to the second communication device, preferably directly and/or using the qualification device as a relay; and k. the second communication device receives and verifies said set of data related to said list of data from the first communication device; and l. at least one among the first communication device and the second communication device generates a new receipt configured to be triply signed digitally signs it, and sends it to the other communication device of at least one among the first communication device and the second communication device; and m. said other communication device of at least one among the first communication device and the second communication device receives said new receipt, verifies it, digitally signs it, and sends it to the qualification device; and n. the second qualification device receives said new receipt and verifies it; and o. the second qualification device generates new updating data, sign these new updating data, inserts a reference of said new updating data in said new receipt; and p. the second qualification device sends said new updating data to the first communication device and to the second communication device; and q. the second qualification device digitally signs the new receipt forming a new at least triply signed receipt, and sends it to the first communication device and to the second communication device; and r. said new at least triply signed receipt comprising:

i) a digital signature of the first communication device; and ii) a digital signature of the second communication device; and iii) a digital signature of the second qualification device; and iv) data related to, preferably a reference to or the actual bytes of, digitally signed new updating data, said new updating data being digitally signed by the qualification device and being configured to update the qualification unit of another qualification device.

According to another aspect, the present invention relates to a method for updating a qualification unit of a qualification device according to the present invention based on updating data carried by a communication device according to the present invention and coming from another qualification device, said method comprising the following steps:

a. receiving by the communication device updating data from said another qualification device; and b. sending by the communication device said updating data to the qualification device; and c. receiving by the qualification device said updating data from the communication device; and d. updating the qualification unit of the qualification device by a processing unit of the qualification device using said updating data.

Before providing below a detailed review of embodiments of the invention, some optional characteristics that may be used in association or alternatively will be listed hereinafter:

According to an example, each communication device of the plurality of communication devices comprises an aggregated digital state stored in its storage unit, said aggregated digital state being generated by forming a tree based on a plurality of calculated hashes and comprising nodes arranged according to a given nodes ordering in the tree, said tree comprising node levels from the leaf nodes, corresponding to the plurality of hashes respectively associated with a plurality of data comprising a digital state of the communication device, to the root node of the tree, every non-leaf node of the tree corresponding to a hash by means of the one-way function of a concatenation of the respective hashes of its child nodes according to a tree concatenation ordering, the root node corresponding to the aggregated digital state hash, i.e. a hash by means of the one-way function of a concatenation of the hashes of the nodes of a penultimate nodes level in the tree according to said tree concatenation ordering, and wherein each communication device of the plurality of communication devices is configured to send said aggregated digital state hash to the qualification device, preferably with an at least triply signed receipt.

According to an example, the aggregated digital state of a given communication device of the plurality of communication devices is modified each time said given communication device realizes a data transfer according to the following scheme:
a. when the given communication device sends data, at least a leaf node of the tree is removed, said leaf node corresponding to said transferred data; and
b. when the given communication device receives data, at least a leaf node of the tree is added, said leaf node corresponding to said transferred data.

According to an example, each communication device of the plurality of communication devices comprises an aggregated digital state stored in its storage unit, and wherein each communication device of the plurality of communication devices is configured to send a hash of said aggregated digital state to the qualification device, preferably with an at least triply signed receipt, said aggregated digital state hash being the hash of the root of a tree, said tree being based on a plurality of trees, said plurality of trees comprising at least:
a. a first tree, said first tree being built using a first tree-building algorithm A1 programmed in the processing unit of each communication device, said first tree comprising:
  i) a leaves level, each leaf of said leaves level comprising data to be transferred; and
  ii) a first nodes level, each node of said first nodes level comprising a hash of the data of the leaves level; and
  iii) preferably additional nodes levels, each node of said additional nodes levels comprising a hash of a cluster, each cluster comprising at least one hash of the data of the previous nodes level; and
b. a second tree, said second tree being built using a second tree-building algorithm A2 programmed in the processing unit of each communication device, said second tree comprising:
  i) a leaves level, each leaf of said leaves level comprising an at least triply signed receipt; and
  ii) a first nodes level, each node of said first nodes level comprising a hash of an at least triply signed receipt of the leaves level; and
  iii) preferably additional nodes levels, each node of said additional nodes levels comprising a hash of a cluster, each cluster comprising at least one hash of an at least triply signed receipt of the first nodes level, and
c. a third tree, said third tree being built using a third tree-building algorithm A3 programmed in the processing unit of each communication device, said third tree comprising:
  i) a leaves level, each leaf of said leaves level comprising a qualification proof data, preferably a cryptographically verifiable proof of some characteristic associated with said communication device; and
  ii) a first nodes level, each node of said first nodes level comprising a hash of a qualification proof data of the leaves level; and
  iii) preferably additional nodes levels, each node of said additional nodes levels comprising a hash of a cluster, each cluster comprising at least one hash of a qualification proof data of the first nodes level; and
d. a branch comprising at least one previous aggregated digital state hash.

According to an example, the qualification unit comprises at least one accumulator storing aggregated digital state hashes of at least a part of the communication devices of the plurality of communication devices, said accumulator being configured to allow a communication device's aggregated digital state hash to be updated only if the new aggregated digital state hash of said communication device evolves from an aggregated digital state hash of said communication device that is currently stored in said accumulator.

According to an example, the qualification unit comprises at least one filter comprising a list of previous aggregated digital state hashes and being configured to check if an aggregated digital state hash is comprised by said list of previous aggregated digital states hashes, preferably to prevent transferring twice the same set of data, advantageously from the same communication device.

According to an example, the updating data comprise an updated accumulator, preferably at least one numeric operand which, when mathematically combined with a value of the accumulator, produces an updated accumulator.

According to an example, the qualification unit comprises a reputation processing module configured to evaluate the reputation of at least one communication device of the plurality of communication devices using a reputation algorithm, said reputation algorithm comprising an artificial intelligence algorithm based on a plurality of parameters taken among at least location of the qualification device, location of the communication devices, time of the data transfer, nature of the data to be transferred, quantity of the data to be transferred; preferably, this tree is automatically and/or continuously tuned using at least a feedback loop that reports the positive and negative correlations between different weights for these different parameters and an observed accuracy of predictions.

According to an example, the communication unit of the qualification device comprises a short-range communication module comprising at least one antenna, configured to enable a short-range communication with respectively the first communication device and/or with the second communication device, when the distance between the short-range communication module and respectively the first communication device and/or the second communication device is lower than 10 m (meter), preferably than 5 m (meter) and advantageously than 25 cm (centimeter).

According to an example, each of the first communication device and the second communication device comprises an aggregated digital state hash stored in its storage unit, said aggregated digital state hash being the hash of the root of a tree, said tree being generated by its processing unit, said generation of said tree comprising the following steps:
a. generating a first tree, said first tree being generating by the processing unit using a first tree-building algorithm A1 programmed in the processing unit:
  i) said first tree comprising:

(1) a leaves level, each leaf of said leaves level comprising data; and
(2) a first nodes level, each node of said first nodes level comprising a hash of the data of the leaves level; and
(3) preferably additional nodes levels, each node of said additional nodes levels comprising a hash of a cluster, each cluster comprising at least one hash of the data of the previous nodes level; and
ii) said first tree-building algorithm A1 executing the following steps:
(1) collecting a plurality of data forming the leaves level; and
(2) hashing at least one data using a first one-way function programmed in the processing unit, in order to get a root hash of the first tree; and
b. generating a second tree, said second tree being built using a second tree-building algorithm A2 programmed in the processing unit:
i) said second tree comprising:
(1) a leaves level, each leaf of said leaves level comprising an at least triply signed receipt; and
(2) a first nodes level, each node of said first nodes level comprising a hash of an at least triply signed receipt of the leaves level; and
(3) preferably additional nodes levels, each node of said additional nodes levels comprising a hash of a cluster, each cluster comprising at least one hash of an at least triply signed receipt of the first nodes level; and
ii) said second tree-building algorithm A2 executing the following steps:
(1) collecting a plurality of at least triply signed receipts forming the leaves level, and
(2) hashing at least one at least triply signed receipt using a second one-way function programmed in the processing unit, to get a root hash of the second tree; and
c. generating a third tree, said third tree being built using a third tree-building algorithm A3 programmed in the processing unit:
i) said third tree comprising
(1) a leaves level, each leaf of said leaves level comprising a qualification proof data, preferably a cryptographically verifiable proof of some characteristic associated with said communication device; and
(2) a first nodes level, each node of said first nodes level comprising a hash of a qualification proof data of the leaves level; and
(3) preferably additional nodes levels, each node of said additional nodes levels comprising a hash of a cluster, each cluster comprising at least one hash of a qualification proof data of the first nodes level; and
ii) said third tree-building algorithm A3 executing the following steps:
(1) collecting a plurality of qualification proof data forming the leaves level; and
(2) hashing at least one qualification proof data using a third one-way function programmed in the processing unit, to get a root hash of the third tree; and
d. generating a branch comprising at least one previous aggregated digital state hash;
e. generating a root hash of the tree using a one-way function programmed in the processing unit based on the root of the first tree, on the root of the second tree, on the root on the third tree and on the previous aggregated digital state hash.

According to an embodiment, the step of validating, by the second qualification device, the qualification of a communication device taken among at least the first communication device and the second communication device comprises at least the following steps:
a. receiving by the second qualification device from a communication device an aggregated digital state hash; and
b. verifying by the qualification unit of the second qualification device that said aggregated digital state hash belongs to and/or is described by at least one accumulator stored by the storage unit of the second qualification device:
i) If the aggregated digital state hash does not belong to said accumulator.
(3) the second qualification device invites the communication device to produce a sequence of data that demonstrates that said aggregated digital state hash is based on an aggregated digital state belonging to said accumulator; and
(4) If the communication device does not provide the second qualification device with said sequence of data, the transfer of data between said communication device and another communication device is cancelled.
ii) If the communication device provides the qualification device with said sequence of data or if the aggregated digital state belongs to said accumulator:
(5) the qualification unit of the second qualification device checks if said aggregated digital state hash is listed in a list of previous aggregated digital state hashes and/or in a deny list of previously unauthorized digital state hashes and/or of unauthorized communication devices, stored in the storage unit of the qualification device:
(a) If said aggregated digital state hash is listed in said previous list and/or deny list, then the data transfer is cancelled.
(b) If the aggregated digital state hash is not listed in said list of previous aggregated digital state hashes or if the aggregated digital state hash is not listed in said deny list, the qualification unit validates the communication device, and preferably allows the data transfer between the communication device and at least another communication device.

BRIEF DESCRIPTION OF THE DRAWINGS

The aims, objects, as well as the technical features and advantages of the invention will emerge better from the detailed description of an embodiment of the invention which is illustrated by the following figures in which.

Figure 1:
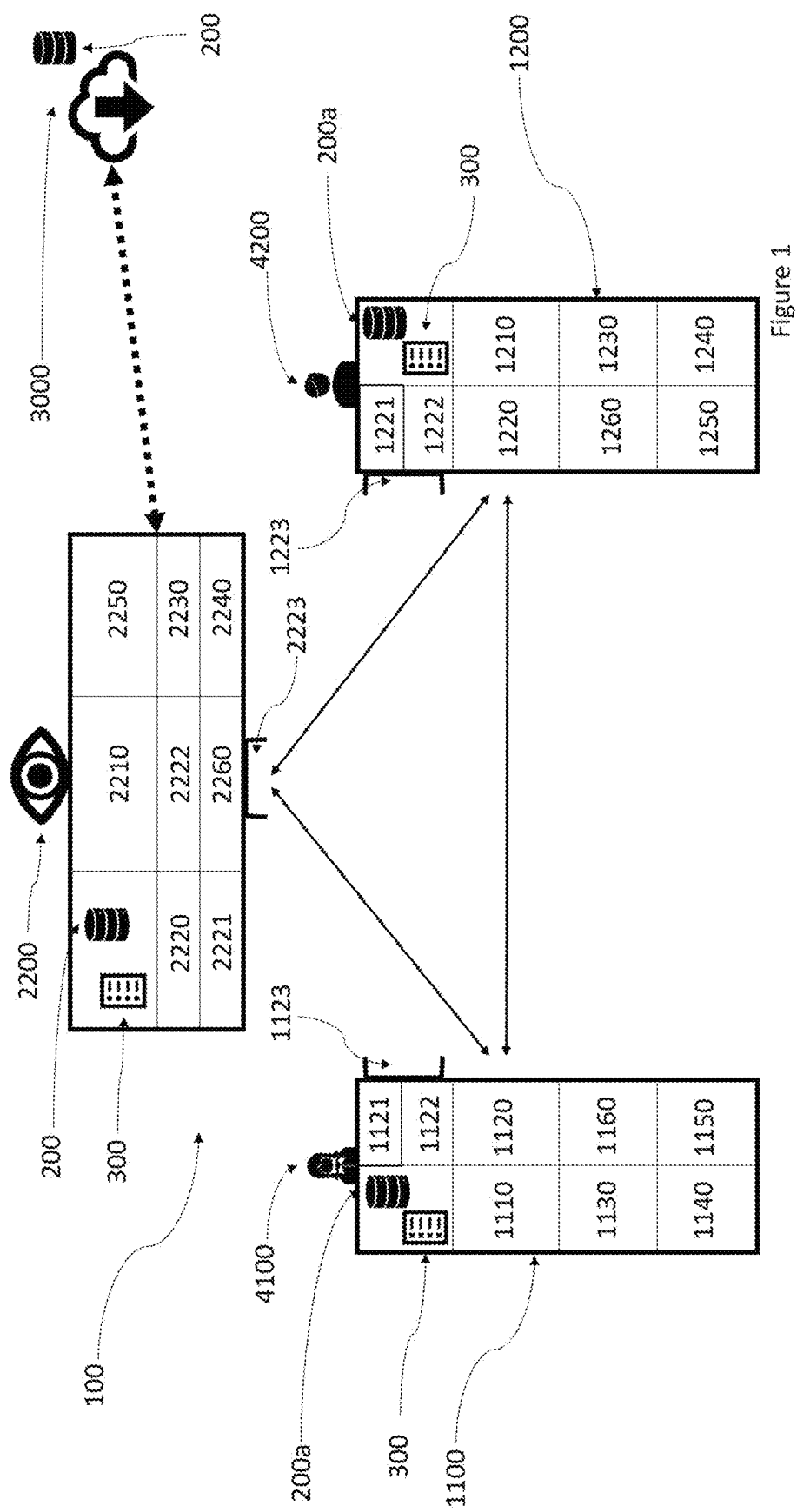
FIG. 1 is a general schematic view of an embodiment of the present invention.
Figure 2:
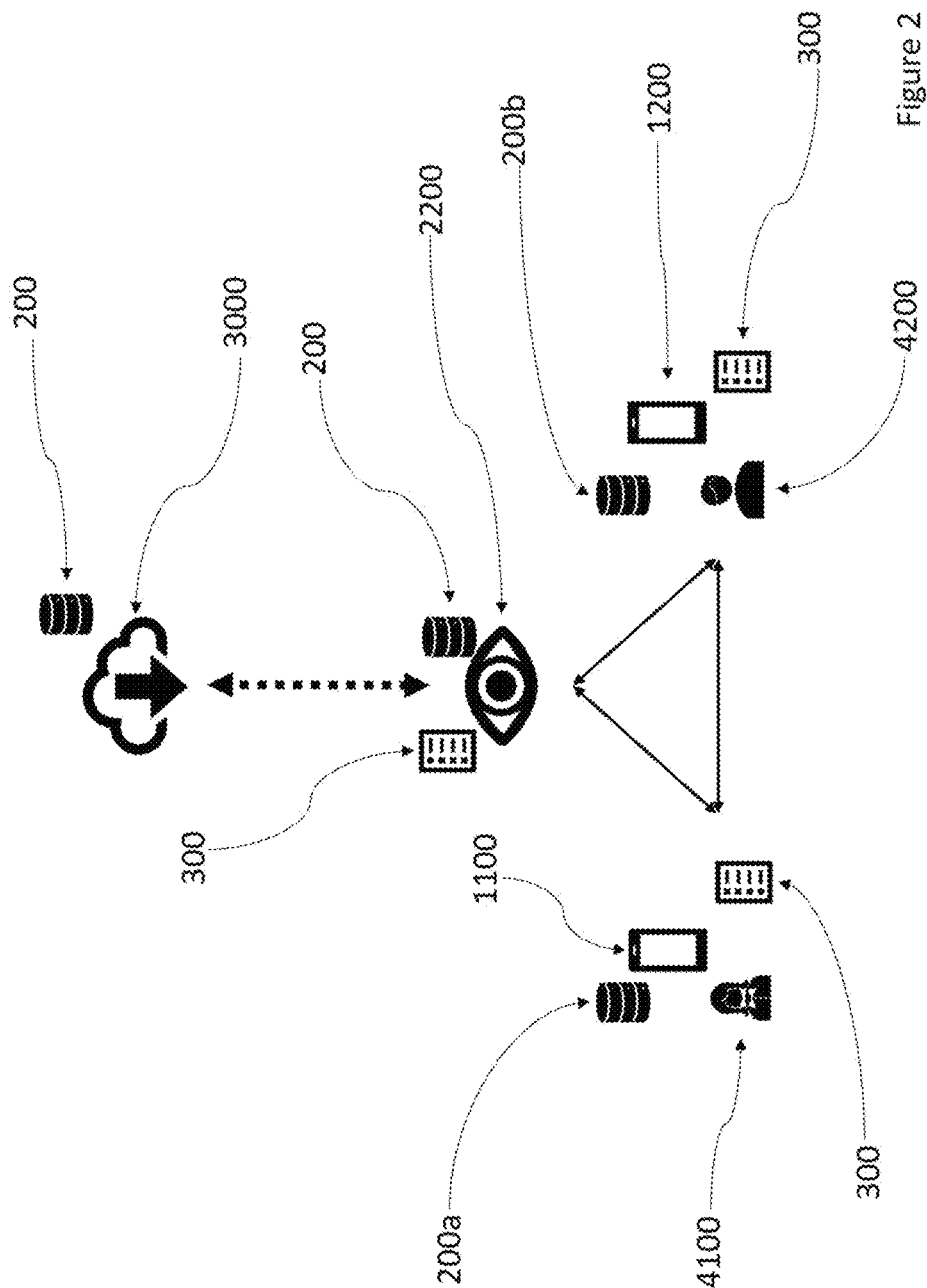
FIG. 2 is a schematic view of an embodiment of the present invention

The drawings are given by way of example and do not limit the invention. They constitute representations of principle intended to facilitate understanding of the invention and are not necessarily on the scale of practical applications.

DETAILED DESCRIPTION

The present disclosure is here described in detail with reference to non-limiting embodiments illustrated in the drawings.

The present invention relates to a system and a method for transferring data between at least a first communication device and at least a second communication device using at least a qualification device.

This system is configured to allow a first communication device to send to a second communication device data or at least a set of data, preferably based on a request from the second communication device to the first communication device and/or based on a proposal from the first communication device to the second communication device. According to an embodiment, the first communication device and the second communication device belong to a plurality of communication devices. The transfer of this set of data is, at least partially, qualified by a qualification device. This qualification device is configured to qualify at least one among the first communication device, the second communication device and the set of data to be transferred, preferably each of these three elements. As discussed hereafter, a transfer of data can be qualified based on the qualification of the first communication device, the second communication device, and the set of data to be transferred.

This qualification device is described hereafter as well as the process of qualification. This qualification device comprises advantageously a qualification unit configured to realize said qualification process. This qualification unit is configured to be updated in order to consider previous data transfers, for example. Indeed, as described hereafter, in some use cases a given data can only be transferred one time from a given communication device, for example, to another given communication device; repeated transfers constitute either error or fraud. Advantageously, and as described hereafter, the system is able to identify and avoid any repeated data transfers, for example when the system is in a mode wherein a given data can be transferred only one time from a given communication device to another given communication device. To do so, and as described hereafter, the qualification unit is updated in order to consider previous data transfers, even if these data transfers have been realized using another qualification unit.

Advantageously each transfer of data generates an update of the qualification unit, this update is preferably in the form of updating data. These updating data are then shared between a plurality of qualification devices. To share these updating data with other qualification devices, according to an embodiment of the present invention, a qualification device has preferably several options, that can be used as the same time to increase the security of this system:

a. sending these updating data to other qualification devices using at least one server, also called a qualification server, i.e. a server in communication with at least one qualification device through a long-range communication network, in an online environment, when the qualification unit is in its online configuration as described hereafter, through at least one communication network; and/or b. sending these updating data to other qualification devices using the communication devices involved in the data transfer characterized by said updating data, when the qualification unit is in its offline configuration as described hereafter, through at least one communication network, preferably at least one local-communication mechanism or at least a short-range communication network, and when the qualification unit is in its online configuration as described hereafter, through at least one communication network; and/or c. preferably, sending these updating data directly to other qualification devices through at least one communication network when the qualification unit is in its online configuration, and/or advantageously through at least one short-range communication network when the qualification unit is in its offline configuration.

According to an embodiment, a qualification server can be a simple server such as a broadcasting server configured to generically distribute data to qualification units.

According to the present invention, in order to reduce the use of bandwidth between a qualification device and a qualification server and/or another qualification device, the updating data can be sent from a qualification device to other qualification devices using the communication devices instead of the qualification servers.

According to the present invention, in a situation wherein the qualification device cannot communicate with one or several qualification servers and/or with one or several other qualification devices, the updating data can be sent from the qualification device to other qualification devices using the communication devices.

The present invention allows to share updating data between one qualification device and other qualification devices using qualification servers and/or communication devices according to different kinds of situations. For example, the qualification device can evaluate a level of data exchange over a communication network, and depending on a predetermined threshold, the qualification device can automatically switch to its offline configuration in order to reduce the level of data exchange over said communication network. For example, the qualification server can evaluate a level of data exchange over a communication network, and depending on a predetermined threshold, send a request to the qualification device to automatically switch to its offline configuration in order to reduce the level of data exchange over said communication network.

The present invention allows to keep updated the qualification unit of the qualification devices even without using a communication network such as the Internet for example, i.e. without using qualification servers, but using communication devices such as for example smartphones of the users of the present invention.

Indeed, the present invention allows to use a communication device, such as a smartphone for example, to, preferably physically, carry updating data from one qualification unit to another qualification unit to update said another qualification unit, advantageously without using qualification servers, i.e. without sending data to said qualification servers.

For example, and as discussed hereafter, the present invention can be used in a situation where a qualification device is in an offline environment, i.e. in a situation where the qualification device cannot communicate with a qualification server, and that a first user wants to send a set of data to a second user. In a situation where this set of data can only be sent one time by the first user, it is mandatory that other qualification devices be aware of the data transfer from the first user to the second user. One way to prevent the first user from transferring another time this set of data is to upload to the communication device of the first user updating data related to this data transfer, and preferably also to the communication device of the second user. When the first user will communicate to another qualification device for transferring a set of data to another communication device, these updating data will be downloaded from the communication device of the first user by this another qualification device in order to qualify this data transfer. In the same way, when the second user will interact with another qualification device, these updating data will be downloaded from the communication device by this another qualification device. And, if this another qualification device is in communication with at least one qualification server, this another qualification device sends these updating data to said qualification server. And this qualification server will send these updating data to several qualification servers, that will send them to several qualification devices in their online configuration.

Now will be described some elements of the present invention according to the FIGS. 1 to 5.

Communication Device According to the Present Invention

According to an embodiment, a communication device 1100 is configured to transfer data to another communication device 1200, 1300, preferably using a first qualification device 2100 and a second qualification device 2200 as described hereafter and in FIGS. 1 to 4. Preferably, a communication device belongs to a plurality of communication devices.

Preferably, a communication device 1100, 1200 comprises:
an authentication unit 1110, 1210; and
a communication unit 1120, 1220; and
a processing unit 1130, 1230; and
storage unit 1140, 1240; and
a transfer unit 1150, 1250; and
preferably, a power unit 1160, 1260.

According to an embodiment, the authentication unit 1110 of the communication device 1100 is configured to authenticate at least a first qualification device 2100, another communication device 1200, 1300 and at least another qualification device 2200, also called a second qualification device 2200. Said authentication can be realized using different kind of processes known by the skilled person. Preferably, said authentication can use authenticated encryption techniques. According to this embodiment, the authentication unit 1110 can be configured to send a response to another device, such as a qualification device 2100, 2200 or another communication device 1200, 1300 without a preceding request but using authenticated encryption to do so. Using an authenticated encryption technique allows to prove the identity of the sender, i.e. the communication device 1100, without said sender ever being challenged first. This technique allows each party to know who sent said response, and has the additional benefit of making the conversation, i.e. the communication between each party, confidential and tamper resistant According to another embodiment, said authentication can comprise the use of digital signatures allowing to benefit from the cryptographic quality of non-repudiation. According to another embodiment, said authentication can use password-based login or API keys for example.

As described hereafter, the communication device 1100 is configured to be able to authenticate several qualification devices 2100, 2200 and several other communication devices 1200, 1300. Likewise, said authentication unit 1110 can be configured to allow the communication device 1100 to be authenticated by one or several qualification devices 2100, 2200 and/or by one or several other communication devices 1200, 1300.

According to an embodiment, the communication unit 1120 is configured to enable a communication with at least one qualification device 2100, 2200 and at least one another communication device 1200, 1300 of a plurality of communication devices. Preferably, the communication unit 1120 of the communication device 1100 is configured to enable a communication with at least a first qualification device 2100 and a second qualification device 2200, preferably not at the same time. Said communication is preferably through at least one communication network. Said communication network preferably comprises a short-range communication network. According to an embodiment, the communication unit 1120, 1220 can comprise a short-range communication module 1121, 1221. Preferably, said short-range communication module 1121, 1221 is configured to enable a short-range communication with said qualification device 2100, 2200 when the distance between the short-range communication module 1121, 1221 and said qualification device 2100, 2200 is preferably lower than 10 m (meter), preferably than 5 m (meter) and advantageously than 25 cm (centimeter). According to an embodiment, the short-range communication module 1121, 1221 can comprise at least one antenna and/or an optical reader 1123, 1223 and/or a display 1122, 1222.

According to an embodiment, said short-range communication module 1121, 1221 can comprise a Near Field Communication (NFC) sub-unit and/or a Bluetooth sub-unit.

According to another embodiment, said communication network can comprise a long-range communication network. According to said another embodiment, the communication unit 1120, 1220 can comprise a long-range communication module. Preferably, said long-range communication module is configured to enable a long-range communication with said qualification device 2100, 2200 when the distance between the long-range communication module and said qualification device 2100, 2200 is preferably greater than 10 m (meter), preferably than 500 m (meter) and advantageously than 1000 m (meter). According to an embodiment, the short-range communication module can comprise at least one antenna and/or an optical reader 1123, 1223 and/or a display 1122, 1222.

According to an embodiment, said short-range communication module can comprise a GSM (Global System for Mobile) sub-unit and/or a LoRaWan (Long Range Wide Area Networks) sub-unit and/or an Internet communication sub-unit. According to an embodiment, the long-range communication network of the communication device 1100, 1200, 1300 comprises the Internet.

According to an embodiment, the communication unit 1120 is configured to send and/or receive data to and/or from a first qualification device 2100, a second qualification device 2200 and a second communication device 1200.

According to an embodiment, the processing unit 1130, 1230 is configured to generate at least one receipt configured to be at least triply signed.

According to an embodiment, the processing unit 1130, 1230 is configured digitally sign, preferably one time, said receipt, advantageously using at least one one-way function. Said receipt is configured to be signed by at least by the communication device 1100, 1200 that has generated it, by at least another communication device and by at least a qualification device. Preferably, said receipt is digitally signed by the communication device that has generated it, then it is digitally signed by another communication device and then it is digitally signed by a qualification device, becoming then an at least triply signed receipt. For convenience and clarity, such receipts can be called a "at least triply signed receipt" in this document. It has to be noticed that before said receipts are fully processed by three separate parties for example—two communication devices plus one qualification device—they contain less than three signatures, and are thus triply signed only by intention, i.e. they are configured to be triply-signed, advantageously to be at least triply signed. According to an embodiment more than three parties can sign a receipt; therefore an at least triply signed receipt is a receipt having at least three digital signatures. Preferably, a receipt and an at least triply signed receipt can be configured to be signed by more than three parties regarding the use case wherein the present invention is implemented. According to an embodiment, the processing unit 1130, 1230 of the communication devices 1100, 1200 uses a private key to sign said receipt. Preferably said private key is associated with a public key belonging to said communication device 1100, 1200.

According to an embodiment, a receipt can be signed by at least three parties, a first communication device, a second communication device and a qualification device. According to an embodiment, a receipt can be signed by more than three parties, preferably by more than two communication devices and one qualification devices. Indeed, according to some use cases of the present invention, the receipt can be generated and signed by a first communication device, belonging to a restaurant for example, and then it can be sent to at least one communication device of a group of communication devices, belonging to a group of customers for example, each of these communication devices can then sign said receipt and send it to another communication device of said group of communication devices, then the last communication device of said group to sign the receipt sends it to a qualification device to finalize said receipt. In this example, the receipt can be signed more than three times. This use case relates for example to a group of customers sharing a bill in a restaurant.

According to an embodiment, the present invention can be also implemented in such a use case in a way wherein a receipt is created for each customer of the group of customers. In this example, each receipt is triply signed at the end of the data transfer. Indeed, in this example, each communication device of said group act independently from the others Preferably, a receipt is a set of data comprising different kinds of information such as metadata related to a transfer of data between said communication device 1100 and another communication device 1200, 1300 using a qualification unit 2100, 2200. Said receipt is configured to be at least triply signed. When said receipt is at least triply signed, it can be called a triple-signed receipt or preferably an at least triply signed receipt. Preferably, an at least triply signed receipt comprises at least three different digital signatures. For example, an at least triply signed receipt can comprise a digital signature of said communication device 1100, preferably over a description of the transferred data, plus a digital signature of another communication device 1200, preferably over the description of the transferred data, plus a digital signature of a qualification device 2100 over the description of the transferred data and over the previous two signatures. Advantageously, the at least triply signed receipt can reference digitally signed updating data, preferably digitally signed by said qualification device 2100, an at least triply signed receipt can be used as a certificate signed by all the parties involved in a data transfer. For example, an at least triply signed receipt can comprise identifiers, for example the identifier of the party; i.e. the communication device 1100, that begins the data transfer, a party descriptor comprising information related to the parties involved in the data transfer, a listing related to the transferred data, a digital signature of each party, i.e. of at least two communication devices 1100, 1200 and of at least one qualification device 2100, a hash of updating data, etc.

According to a preferred embodiment, the processing unit 1130, 1230 of the communication device 1100, 1200 is configured to use the authentication unit 1110, 1210 of the communication device 1100, 1200. For example, the processing unit 1130, 1230 can be configured to execute an authenticated encryption process, preferably that proves the identity of the device to the other parties in a data transfer, and that verifies the identity of those other parties. Advantageously, the processing unit 2230 of the qualification device 2200 is configured to use the authentication unit 2210 of the qualification device 2200, with the same effect, as described hereafter.

According to another embodiment, the processing unit 1130, 1230 of the communication device 1100, 1200 can be configured to generate at least one challenge to authenticate at least a qualification device 2100, 2200, preferably using the authentication unit 1110, 1210 of the communication device 1100, 1200. Said challenge can be generated by the processing unit 1130, 1230 of the communication device 1100, 1200 and sent to a qualification device 2100, 2200 by the communication unit 1120, 1220 of the communication device 1100, 1200. According to said another embodiment, the processing unit 1130, 1230 can be configured to request said qualification device 2100, 2200 to digitally sign said challenge, preferably in real-time, advantageously during the same communication session between the communication device 1100, 1200 and said qualification device 2100, 2200, and to send back to it the digitally signed challenge, in order to authenticate said qualification device 2100, 2200.

According to said another embodiment, the processing unit 1130, 1230 of the communication device 1100, 1200 can be configured to generate at least one challenge to authenticate at least another qualification device 2200, preferably using the authentication unit 1110, 1210.

According to an embodiment, the processing unit 1130, 1230 of the communication device 1100, 1200 is configured to authenticate itself, preferably using authenticated encryption, but also possibly using other authentication methods well known to the skilled person in the art.

According to an embodiment, the storage unit 1140, 1240 of the communication device 1100, 1200 is configured to store data, and preferably a list of data Said storage unit 1140, 1240 is configured preferably to store at least one at least triply signed receipt of at least a previous data transfer, i.e. a previous at least triply signed receipt that has been digitally signed by said communication device 1100, 1200 during a previous data transfer.

According to an embodiment, said storage unit 1140, 1240 is configured to store updating data. These updating data can have been received by the communication unit 1220, 2220 of the communication device 1100, 1200 from at least one first qualification device 2100, also called a previous qualification device 2100, preferably during a first data transfer, also called a previous data transfer. These updating data are configured to be downloaded by at least a second qualification device 2200, preferably during a second data transfer, also called a next data transfer, preferably from said communication device 1100, 1200.

According to an embodiment, updating data are configured to update the qualification unit 2250 of a qualification device 2200. These updating data can comprise several kinds of information, as described hereafter.

According to a preferred embodiment, the communication device 1100, 1200 comprises an aggregated digital state, preferably stored in its storage unit 1140, 1240. Said aggregated digital states is configured to define, preferably in a cryptographic way, the digital state of the communication device 1100, 1200, advantageously of at least a part of the data stored in the storage unit 1140, 1240 of the communication device 1100, 1200. Said aggregated digital state is configured to evolve, i.e. to be modified, each time the communication device 1100 sends and/or receives a set of data to another communication device 1200 and/or a qualification device 2100, 2200. Said aggregated digital state can be related with for example at least one sequence of data transfer receipts. This sequence, as discussed hereafter, can be used to demonstrate that the actual digital state of the communication device 1100, 1200, preferably that the actual hashed digital state of the communication device 1100, 1200, evolves from a known digital state, i.e. from a known hashed digital state.

According to an embodiment, the communication device 1100, 1200 is configured to send said aggregated digital state hash to the qualification unit 2100, 2200, preferably with an at least triply signed receipt, advantageously a previous at least triply signed receipt.

Figure 4:
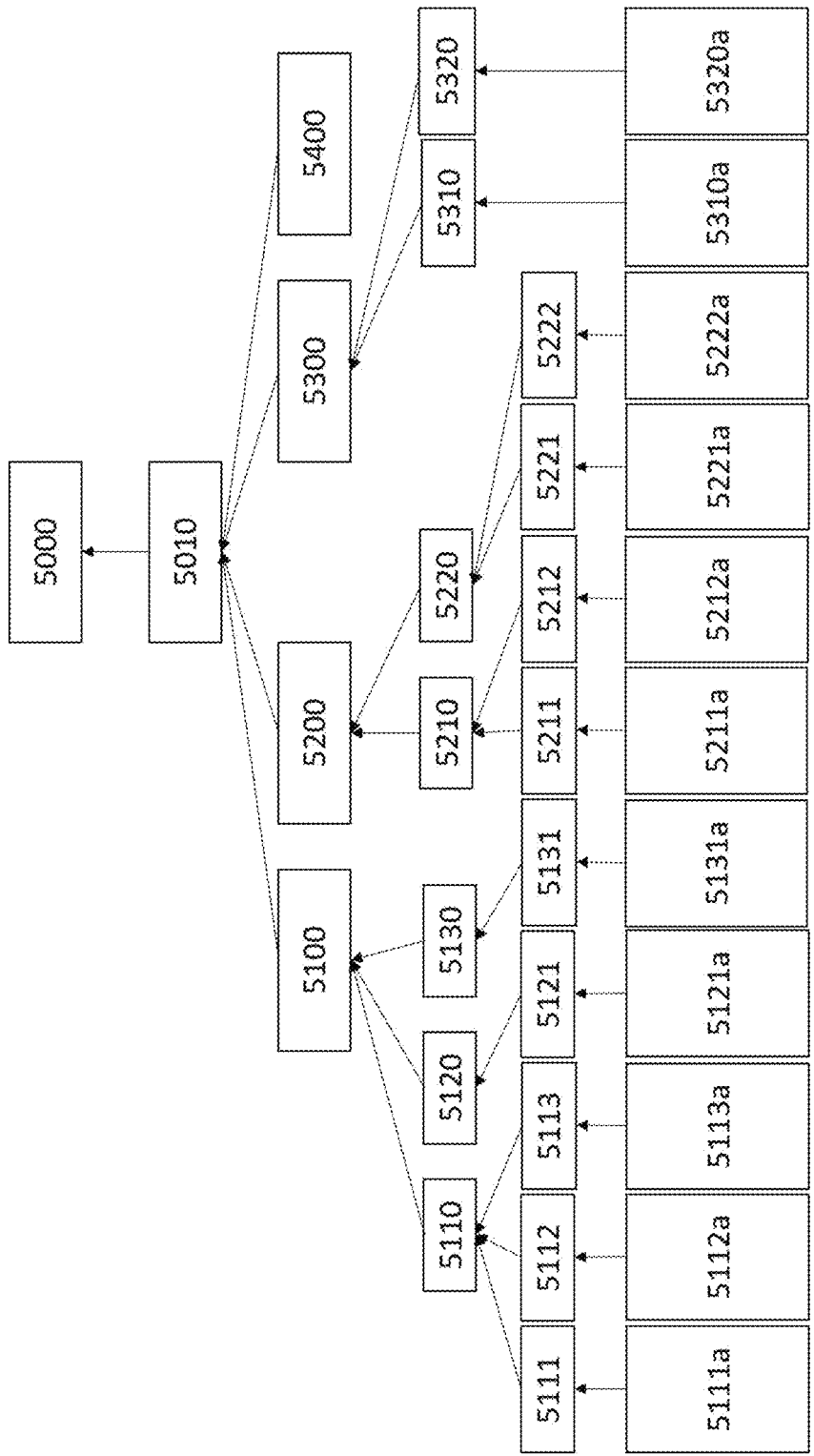
FIG. 4 is a schematic view of a digital state hash according to an embodiment of the present invention.

For example, and as illustrated by FIG. 4, said aggregated digital state hash 5000 can be generated by forming a tree based on a plurality of calculated hashes 5010, 5100, 5200, 5300, 5400, preferably using at least one one-way function, and comprising nodes 5100, 5200, 5300, 5400, 5110, 5120, 5130, 5210, 5220, 5310, 5320 arranged according to a given node's ordering in the tree. Preferably, said tree comprises node levels from the leaf nodes, corresponding to the plurality of hashes 5111, 5112, 5113, 5121, 5131, 5211, 5212, 5221, 5222, 5400 respectively associated to a plurality of data comprising a digital state of the communication device 1100, 1200, 1300, to the root node 5000 of the tree, every non-leaf node of the tree corresponding to a hash 5110, 5120, 5130, 5210, 5220, 5300 by means of the one-way function of a concatenation of the respective hashes 5111, 5112, 5113, 5131, 5211, 5212, 5221, 5222, 5310, 5320 of its child nodes according to a tree concatenation ordering. Advantageously, the root node 5000 of said tree corresponds to the aggregated digital state hash, i.e. a hash by means of the one-way function of a concatenation of the hashes of the nodes of a penultimate nodes level in the tree according to said tree concatenation ordering. According to another embodiment, digital signatures can be used instead of hashes and/or as well as hashes.

According to an example and as illustrated in FIG. 4, the aggregated digital state hash, also called the digital state hash 5000, corresponds to a hash of a list of hashes 5010. Said list of hashes 5010 comprises preferably at least a root hash of data 5100, a root hash of at least triply signed receipts 5200, preferably of previous at least triply signed receipts, a previous digital state hash 5400 and advantageously a root hash of proof data 5300. Preferably, said root hash of data 5100 is based on the hash of hashes of data 5111, 5112, 5113, these hashes of data 5111, 5112, 5113 corresponding to the hash of data 5111*a*, 5112*a*, 5113*a* configured to be transferred. Advantageously, said root hash of data 5100 is based on the hash of hashes of clusters 5110, 5120, 5130 of hashes of data 5111, 5112, 5113. According to an embodiment, the root hash of at least triply signed receipts 5200 is based on the hash of hashes of at least triply signed receipts 5211, 5212, 5221, 5222, these hashes of at least triply signed receipts 5211, 5212, 5221, 5222 corresponding to at least triply signed receipts 5211*a*, 5212*a*, 5221*a*, 5222*a*, preferably related to previous data transfers. Advantageously, said root hash of at least triply signed receipts 5200 is based on the hash of hashes of clusters 5210, 5220 of hashes of at least triply signed receipts 5211, 5212, 5221, 5222. According to an embodiment, said root hash of proof data 5300 is based on the hash of proof data, which is, as described hereafter, a cryptographically verifiable proof of some characteristic associated with the communication device 1100. According to an embodiment, the previous digital state hash 5400 is the digital state hash that had the communication device 1100 just before the digital state hash 5000.

According to an embodiment, the digital state hash 5000 is based on a merkle tree of hashes.

According to an embodiment, a digital state of the communication device 1100, 1200, 1300 relates to the previous data transfers executed by said communication device 1100, i.e. relates to the previous set of data received and the previous set of data sent by said communication device 1100. Preferably, a digital state hash of the communication device 1100, 1200, 1300 relates to the hashes of the previous data transfers executed by said communication device 1100, i.e. relates to the hashes of previous set of data received and the hashes of the previous set of data sent by said communication device 1100.

Advantageously, said aggregated digital state is modified each time said communication device 1100 realizes a data transfer. Preferably, said aggregated digital state hash is modified according to the following scheme:

a. when the communication device 1100 sends data, at least one leaf node of the tree is removed, said leaf node corresponding to said transferred data; and b. when the communication device 1100 receives data, at least one leaf node of the tree is added, said leaf node corresponding to said transferred data.

For example, each time the communication device 1100 sends a data 5111*a* to another communication device 1200, said data 5111*a* is removed from the tree generating the digital state hash 5000 of the communication device 1100.

For example, each time the communication device 1100 receives a data from another communication device 1200, said data becomes a new leaf in the tree generating the digital state hash 5000 of the communication device 1100.

According to an embodiment, the aggregated digital state can be the hash of the root of a tree. As previously described, said tree can be based on a plurality of trees and a branch, said branch comprising advantageously at least one previous aggregated digital state of said communication device, advantageously the most recent aggregated digital state of said communication device.

Preferably, said plurality of trees comprises at least:

a. a first tree, preferably having a root hash of data 5100; and b. a second tree, preferably having a root hash of at least triply signed receipts 5200; and c. a third tree, preferably having a root hash of proof data 5300.

According to an embodiment, said first tree is built using a first tree-building algorithm A1. Said tree-building algorithm A1 is preferably programmed in the processing unit. Said first tree can comprise:

a. a leaves level, each leaf of said leaves level comprising a data or a set of data to be transferred 5111*a*, 5112*a*, 5113*a*, 5121*a*, 5131*a*, in one embodiment, this data to be transfer can be a verifiable data, as described hereafter; and b. a first nodes level 5111, 5112, 5113, 5121, 5131, each node of said first nodes level comprising a hash of the data of the leaves level, preferably using a one-way function; and
c. preferably additional nodes levels 5110, 5120, 5130, each node of said additional nodes levels comprising a hash of a cluster, each cluster comprising at least one hash of the data 5111a, 5112a, 5113a, 5121a, 5131a of the previous nodes level 5111, 5112, 5113, 5121, 5131.

According to an embodiment, a data to be transferred is a data that is hashable and therefore tamper-evident because its hash, stored in the tree, is provably derived from the data to be transferred. This is the data to be transferred under the carefully controlled conditions that the qualification unit is enforcing. Advantageously, said data allows a qualification device 2100, 2200, 2300 to verify if this data has been signed by the issuer of said data.

According to an embodiment, the data to be transferred can comprise or be a verifiable data, i.e. a data signed by the issuer of said data, such as a central bank in the case where the data to be transferred comprise digital cash, or such as a blockchain in the case where the data to be transferred comprises or is a token and/or an NFT (Non-Fungible Token).

Preferably, the first tree-building algorithm A1 is configured to create said first tree from said data to be transferred, and advantageously from said verifiable data.

According to an embodiment, said second tree is built using a second tree-building algorithm A2. Said second tree-building algorithm A2 is preferably programmed in the processing unit. Said second tree can comprise:
a. a leaves level, each leaf of said leaves level comprising an at least triply signed receipt 5211a, 5212a, 5221a, 5222a; and
b. a first nodes level, each node of said first nodes level comprising a hash of an at least triply signed receipt 5211, 5212, 5221, 5222 of the leaves level, preferably using a one-way function; and
c. preferably additional nodes levels 5210, 5220, each node of said additional nodes levels comprising a hash of a cluster, each cluster comprising at least one hash of an at least triply signed receipt 5211a, 5212a, 5221a, 5222a of the previous nodes level 5211, 5212, 5221, 5222.

Preferably, the second tree-building algorithm A2 is configured to create said second tree from said at least triply signed receipts 5211a, 5212a, 5221a, 5222a.

According to an embodiment, said third tree is built using a third tree-building algorithm A3. Said third tree-building algorithm A3 is preferably programmed in the processing unit. Said third tree can comprise:
a. a leaves level, each leaf of said leaves level comprising a qualification proof data 5310a, 5320a; and
b. a first nodes level, each node of said first nodes level comprising a hash 5310, 5320 of a proof data 5310a, 5320a of the leaves level, preferably using a one-way function; and
c. preferably additional nodes levels, each node of said additional nodes levels comprising a hash of a cluster, each cluster comprising at least one hash of a proof data 5310a, 5320a of the previous nodes level.

According to an embodiment, a proof data, also called a qualification proof data, is a cryptographically verifiable proof of some characteristic associated with this communication device. For example, it could be a direct anonymous attestation (DAA) from a secure enclave on the storage unit 1140 of the communication device 1100, showing that the device's hardware has not been tampered with since manufacture. It could also be a bullet proof or a Non-interactive zero-knowledge proofs (NIZK) circuit or a zk-SNARKs circuit that shows that the communication device 1100 is owned by a particular party, and for example has a particular license, or for example is registered in a particular jurisdiction, etc.

According to an embodiment, a proof data, also called a qualification proof data, is a piece of evidence that demonstrates that a party, a communication device 1100 and/or a qualification device 2100, has complied with requirements of a governance framework for example. This is preferably a zero-knowledge proof that the party has escrowed its identity, and/or proof that the party is citizens of a particular country for example, etc.

Preferably, the third tree-building algorithm A3 is configured to create said third tree from said proof data proof.

Advantageously, each communication device 1100, 1200, 1300 of a plurality of communication devices comprises at least one aggregated digital state related to at least its previous data transfers, i.e. at least one digital state hash related to at least its previous data transfers. Each time a communication device 1100, 1200, 1300 sends and/or receives data, its aggregated digital state is updated, i.e. its digital state hash becomes an updated aggregated digital state hash, also called a new aggregated digital state hash or a new digital state hash.

Preferably, each time the digital state of a communication device 1100 changes, the aggregated digital state of the communication device 1100 changes, i.e. a new aggregated digital state is calculated based on the previous process of generation of a tree.

Advantageously, each time the digital state of a communication device 1100 changes, the digital state hash of the communication device 1100 changes, i.e. a new digital state hash is calculated based on the previous process of generation of a tree.

According to an embodiment, each time a communication device 1100 wants to send or to receive data from another communication device 1200 using a qualification unit 2200, said communication device 1100 sends its aggregated digital state hash to said qualification unit 2100, preferably with a signed receipt or at least a portion of an at least triply signed receipt, also called an incomplete triple-signed receipt or a partially signed receipt, advantageously with the beginnings of an at least triply signed receipt, i.e. a receipt that is configured to be at least triply signed. According to an embodiment, at first this receipt is not complete because it only comprises the signature of its initial sender, i.e. of the communication device 1100.

According to an embodiment, this incomplete triple-signed receipt, also called receipt and/or incomplete at least triply-signed receipt, references two aggregated digital state hashes—one for the root of the state hash tree associated with the sender's state before the transfer began, and one for the root of the state hash tree that the sender will have after the transfer is finalized and its state has changed. Advantageously, said receipt references at least two aggregated digital state hashes—one for the root of the digital state hash tree associated with the communication device's digital state before the data transfer began, and one for the root of the digital state hash tree that the communication device will have after the data transfer is finalized and its digital state has changed.

According to an embodiment, and as described hereafter, a qualification unit 2100 can comprise at least one accumulator. Said accumulator stores preferably aggregated digital state hashes from at least a part of the communication devices 1100, 1200, 1300 of said plurality of communication devices. Said accumulator is configured to be updated only if a new aggregated digital state hash of a given communication device 1100, 1200, 1300 evolves from an aggregated digital state hash of said given communication device 1100, 1200, 1300 that is currently stored in the accumulator. For example, when a communication device 1100, 1200, 1300 receives and/or sends data, its aggregated digital state evolves to an updated aggregated digital state, then the communication device 1100, 1200, 1300 sends a hash of said updated aggregated digital state; then, as described hereafter, if this updated aggregated digital state hash evolves from an aggregated digital state hash already comprised, i.e. described, by said accumulator, then said accumulator is updated with this updated aggregated digital state hash. This update of the accumulator will be detailed hereafter.

According to an embodiment, the updating data can comprise a numeric operand which, when mathematically combined with the current accumulator value, produces an updated accumulator. In an embodiment of the invention where qualification units 2250 learn about updates via communication devices 1100, 1200, 1300, updating data are preferably sent to at least a first communication device 1100 and/or a second communication device 1200 from the qualification unit 2150 when data are transferred between said first communication device 1100 and said second communication device 1200, preferably based on said updated accumulator and/or on said transferred data.

As discussed hereafter, these updating data allow a qualification device 2200 to be, at least partially, updated by at least one communication device 1100, 1200. This allows the qualification device 2100 to be updated even in its offline configuration as described hereafter.

According to an embodiment, the transfer unit 1150 of the communication device 1100 is configured to transfer data from the communication device 1100, preferably stored in the storage unit 1140, to a qualification device 2200 and/or another communication device 1200. Preferably, said transfer unit 1150 is configured to generate a set of data to be sent to another communication device 1200 by taking data stored in the storage unit 1140 of the communication device 1100. Said transfer unit 1150 is configured advantageously for generate a set of data according to at least one predetermined protocol in order to send this set of data to another communication device 1200.

According to an embodiment, the power unit 1160, 1260 of the communication device 1100, 1200 is configured to provide electricity to the communication device 1100, 1200, preferably to all the units of the communication device 1100, 1200.

According to an embodiment, the communication device 1100, 1200 can be configured to be electrically powered by another device such as a qualification device 2100, 2200. According to this embodiment, the communication device 1100, 1200 can comprise an induction module configured to power the communication device 1100, 1200 from an electromagnetic field, preferably generated by the qualification device 2100, 2200.

According to an embodiment, the communication device 1100 is configured to:
a. authenticate another communication device 1300 of a plurality of communication devices and at least a qualification device 2200, and
b. preferably, receive at least one request from said another communication device 1300 to prepare for transfer of data, preferably of a set of data, through said communication network, and/or to preferably send at least one proposal to said another communication device 1300 to prepare for transfer of data, preferably of a set of data, through said communication network; and
c. submit to said qualification device 2200 at least:
   i) a list of data related to a set of data to be transferred to said another communication device 1300 and/or from said another communication device 1300;
   ii) preferably, a first at least triply signed receipt, advantageously if the qualification device 2100 requests an at least triply signed receipt, said at least triply signed receipt comprising:
      a digital signature of the communication device 1100; and
      a digital signature of a different communication device 1200; and
      a digital signature of a previous qualification device 2100, and
      digitally signed updating data, said updating data being digitally signed by said previous qualification device 2100; and
   iii) updating data, said updating data coming from said previous qualification device 2100, said updating data being configured to update the qualification unit 2250 of said qualification device 2200; and
d. be qualified by at least said qualification device 2200; and
e. generate a new receipt, preferably partially signed, advantageously digitally signed by the communication device 1100, and to send it to said another communication device 1300, and/or to receive a new receipt, preferably partially signed, advantageously digitally signed by said another communication device 1300, and to digitally sign it and to send it to the qualification device 2200; and
f. receive from the qualification device 2200 new updating data; and
g. receive from said qualification device 2200 a new receipt digitally signed by said qualification device 2200 and by said another communication device 1300; and
h. receive from said qualification device 2200 new updating data being configured to update the qualification unit of another qualification device; and
i. advantageously, send to the qualification device 2200 an aggregated digital state hash related to the state of the communication device 1100; and
j. advantageously, calculate a new aggregated digital state, and preferably its associated hash, based on the data transfer.

According to an embodiment, the present invention relates to a computer program comprising instructions which, when the program is executed by the processing unit of a communication device, cause the processing unit to carry out the previous described steps a to j.

According to an embodiment, the present invention relates to a computer-readable storage medium comprising instructions which, when the program is executed by the processing unit of a communication device, cause the processing unit to carry out the previous described steps a to j.

During and/or after the transfer of data from the communication device 1100 to the other communication device 1300, a new at least triply signed receipt is preferably generated. Said new at least triply signed receipt comprises preferably at least a digital signature of the communication device 1100, a digital signature of said another communication device 1300, a digital signature of said qualification device 2200. It also advantageously references digitally signed new updating data, said new updating data being digitally signed by said qualification device 2200. Preferably, said new at least triply signed receipt comprises the hash of the updating data. Said new updating data are designed to allow a different qualification device to update its qualification unit.

After the transfer of data from the communication device 1100 to the other communication device 1300, a new aggregated digital state is preferably generated. Said new aggregated digital state is calculated based on the aggregated digital state of the communication device 1100 before the data transfer and based on the new at least triply signed receipt.

According to an embodiment, the communication device 1100, 1200, 1300 can comprise at least one material-based security feature. Said material-based security feature is configured to allow at least a qualification device 2100, 2200 and/or another communication device 1100, 1200, 1300 to assess the integrity of the communication device 1100, 1200, 1300. According to an embodiment, said material-based security feature can comprise a seal that must be destroyed to open the outer case of the communication device 1100, 1200, 1300 for example. According to a preferred embodiment, said material-based security feature can comprise a security fuse or dead-man's switch to render the communication device 1100, 1200, 1300 tamper-evident at time of manufacture.

According to an embodiment, the communication device 1100, 1200, 1300 can comprise at least one firmware security feature. Said firmware security feature is configured to allow at least a qualification device 2100, 2200 and/or another communication device 1100, 1200, 1300 to authenticate the communication device 1100, 1200, 1300. Preferably, said firmware security feature can comprise a secure enclave that supports direct anonymous attestation, for example.

According to an embodiment, the communication device 1100, 1200, 1300 can be a smartcard, a smartphone, a tablet, a personal computer, a server, an IoT device, etc.

According to an embodiment, the communication device 1100, 1200, 1300 can be a digital wallet configured to store, to receive and to send tokens. Preferably a set of data can comprise at least one token.

Preferably, the communication device 1100, 1200, 1300 is a mobile device designed to be moved from one location to another by a user. Being mobile allows the communication device 1100, 1200, 1300 to carry updating data from one place to another, advantageously from one qualification device 2100 to another 2200.

Advantageously, the updating data carried by a communication device 1100, 1200, 1300 comes from the qualification device 2100, 2200 used in the last data transfer involving said communication device 1100, 1200, 1300. Preferably, each time a communication device 1100, 1200, 1300 executes a data transfer, i.e. send and/or receive data to and/or from another communication device 1100, 1200, 1300, it receives from the qualification device 2100, 2200 involved in this data transfer updating data.

According to an embodiment, at any time after its first data transfer, a communication device 1100, 1200, 1300 carries updating data coming from one qualification device 2100, 2200 at a time.

According to another embodiment, at any time after its first data transfer, a communication device 1100, 1200, 1300 carries updating data coming from several qualification device 2100, 2200.

Qualification Device According to the Present Invention

According to an embodiment, and as described in FIGS. 1 to 5, the qualification device 2200, as previously described, is configured to authorize, and attest a transfer of data between at least a first communication device 1100 and a second communication device 1200. Preferably, the qualification device 2200 is configured to verify a plurality of parameters linked to said data transfer in order to qualify at least the first communication device 1100 and/or the second communication device 1200 and/or the data to be transferred and/or the data transfer. Preferably, qualifying the data transfer comprises qualifying at least the first communication device 1100 and the second communication device 1200.

According to an embodiment, the qualification device 2200 can comprise at least two configurations. At least one configuration of the qualification device 2100 corresponds to a so-called "online" configuration, wherein the qualification device 2200 is configured to communicate with at least a qualification server 3000 and/or another qualification device 2100, preferably through at least a communication network, advantageously through at least a long-range communication network. According to an embodiment, this network does not need to be high-speed, and it doesn't need to be the Internet. According to an embodiment, this long-range communication network can be low-speed and/or high-speed. At least one of configuration of the qualification device 2200 corresponds to an "offline" configuration wherein the qualification device 2200 is configured to not communicate or to avoid communication with at least a qualification server 3000 and/or another qualification device 2100 through at least said communication network. Said offline configuration can be due to a lack of communication network, and/or a need to tolerate low bandwidth and/or inconsistent service, between said qualification device 2200 and said qualification server 3000 and/or said another qualification device 2100. Said offline configuration can be due to predetermined rules as described hereafter.

According to an embodiment, the qualification device 2200 can comprise:
    a. an authentication unit 2210; and
    b. a communication unit 2220; and
    c. a qualification unit 2250; and
    d. a storage unit 2240; and
    e. a processing unit 2230; and
    f. preferably, a power unit 2260.

According to an embodiment, the authentication unit 2210 of the qualification device 2200 is configured to enable authentication of at least a communication device 1100, 1200, 1300, preferably at least a plurality of communication devices, and advantageously a first communication device 1100 and a second communication device 1200, 1300. Said authentication can be done in the same way as for the communication device 1100, 1200, 1300 previously described. According to a preferred embodiment, said authentication can be done using authenticated encryption. According to another embodiment, other techniques such as digital signatures or password-based login can also be used. According to another embodiment, said authentication can be realized using different kinds of processes known by the skilled person, as previously described regarding the communication device 1100, 1200, 1300.

As described hereafter, the qualification device 2200 is configured to be able to authenticate several communication devices and preferably several other qualification devices and/or preferably several qualification servers. According to a preferred embodiment, the qualification servers 3000 need not to be trusted by the qualification device 2200, as they transmit data that preferably is tamper-evident or verifiable, and thus preferably do not require to be authenticated. As the same time, said authentication unit 2210 can be configured to allow the qualification device 2200 to be authenticated by one or several communication devices and/or one or several other qualification devices, and/or preferably one or several qualification servers. Advantageously, the data exchanged between a qualification device 2200 and at least one qualification server 3000 are preferably tamper-evident or verifiable, this allows the qualification server 3000 to be untrusted by the qualification device 2200, i.e. this avoid the qualification device 2200 to authenticate the qualification servers 3000, i.e. this avoids the qualification server 3000 to be authenticated by the qualification device 2200. According to an embodiment, the data exchanged between a qualification device 2200 and at least another qualification device comprise updating data.

According to an embodiment, the communication unit 2220 of the qualification device 2200 is configured to enable a communication with at least a plurality of communication devices 1100, 1200, 1300, preferably with at least a first communication device 1100 and a second communication device 1200, 1300. Said communication is preferably established through at least a communication network. Said communication network can comprise a long-range communication network and/or a short-range communication network as previously described. Said communication network can comprise different kinds of communications networks such as a mobile phone communication network, the Internet, etc.

According to an embodiment, the communication unit 2220 of the qualification device 2200 can enable a communication with at least one communication device 1100, 1200, 1300 when the qualification device 2200 is in its online configuration and/or when the qualification device 2200 is in its offline configuration.

According to an embodiment, the communication unit 2230 of the qualification device 2200 is configured to enable a communication with at least one server 300, also called a qualification server, and/or with at least another qualification device preferably through at least said communication network, advantageously when the qualification device 2200 is in its online configuration. Preferably, the qualification device 2200 communicates with at least one qualification server 3000 and/or another qualification device 2100 through said long-range communication network.

According to an embodiment, when the qualification device 2200 is in its online configuration, it is configured to communicate with at least a first communication device 1100, a second communication device 1200, 1300, a qualification server 3000 and/or another qualification device 2100. Advantageously, when the qualification device 2200 is in its online configuration, it can receive and/or send data, preferably updating data, from and/or to at least a qualification server 3000 and/or another qualification device 2100 and/or at least one communication device 1100, 1200, 1300.

According to an embodiment, when the qualification device 2200 is in its offline configuration, it is configured to communicate with a first communication device 1100 and a second communication device 1200, 1300, but not with a qualification server 3000 and/or not with another qualification device 2100, preferably not directly with another qualification device 2100. According to an embodiment, the qualification device 2200 can communicate with another qualification device 2100, when it is in its offline configuration, using the first communication device 1100 and/or the second communication device 1200, preferably as carrier of updating data.

According to an embodiment, the communication unit 2220 of the qualification device 2200 can comprise a short-range communication module 2221. Preferably, said short-range communication module 2221 is configured to enable a short-range communication with said first communication device 1100 and/or said second communication device 1200, 1300 when the distance between the short-range communication module 2221 and said first 1100 and/or second 1200, 1300 communication device is lower than 10 m (meter), preferably than 5 m (meter) and advantageously than 25 cm (centimeter). According to an embodiment, the short-range communication module 2221 of the communication unit of the qualification device 2200 can comprise at least one antenna and/or a camera 2223 and/or a display 2222.

According to an embodiment, the short-range communication module 2221 can comprise a first antenna and a second antenna. The first antenna is configured to establish a short-range communication with the first communication device 1100. The second antenna is configured to establish a short-range communication with the second communication device 1200, 1300. According to an embodiment, the short-range communication module 2221 can comprise one antenna configured to establish a short-range communication with the first communication device 1100 and/or with the second communication device 1200.

According to an embodiment, the communication unit 2220 of the qualification device 2200 can comprise a long-range communication module. Preferably, said long-range communication module is configured to enable a long-range communication with at least one qualification server 3000 and/or at least one qualification device 2100, and preferably with said first communication device 1100 and/or said second communication device 1200, 1300. Said long-range communication network relates to a communication over a distance greater than a short-range communication distance, advantageously greater than 10 times a short-range communication distance. According to an embodiment, the long-range communication module of the communication unit 2220 of the qualification device 2200 can comprise at least one antenna and/or a display 2221 and/or an optical reader 2222 and/or an audio receiver and/or an audio emitter.

According to an embodiment, the long-range communication module can be configured to use electromagnetic waves and/or sound waves as a communication medium. According to an embodiment, the long-range communication module can use communication network such as LoRaWan and/or ultra-sound waves network and/or infra-sound waves network.

According to an embodiment, the switch between the online configuration to the offline and/or between the offline configuration to the online configuration can be due to several events; for example, the qualification device 2200 can lose the communication with a qualification server 3000 and/or another qualification device 2100 due to some problem inside the communication network, or because the qualification device 2200 has been moved, i.e. installed, to a place where the communication network cannot be reached, for example a place where there is no Internet connection, but still a short-range communication network is accessible to allow communication devices 1100, 1200,

1300 to communicate with the considered qualification device 2200, or because of a predetermined schedule triggering said switch, or because of a predetermined random rotation between these two configurations.

According to an embodiment, the qualification device 2200 can have the capability to switch between the online communication and the offline communication, preferably according to predetermined rules, for example. According to an embodiment, these predetermined rules can comprise the following rules:
- a. to switch from the online configuration to the offline configuration if the communication unit 2220 of the qualification device 2200 cannot reach a qualification server 3000 and/or another qualification device 2100 over the communication network, preferably over the long-range communication network;
- b. to switch from the offline configuration to the online configuration if the communication unit 2220 of the qualification device 2200 can reach at least one qualification server 3000 and/or at least one another qualification device 2100 over the communication network, preferably over the long-range communication network;
- c. to switch from the online to the offline configuration if the flux of data circulating over the communication network exceeds or falls below a predetermined threshold;
- d. preferably, to switch from the offline configuration to the online configuration if the flux of data circulating over the communication network is lower than a predetermined threshold;
- e. preferably, to switch from the online to the offline configuration if the flux of data circulating over the communication network is equal or higher than a predetermined threshold;
- f. to switch from the online to the offline configuration if the power unit 2260 of the qualification device 2200 indicates to the processing unit 2230 of the qualification device 2200 that the level of energy of the qualification device 2200 is lower than a predetermined threshold;
- g. to switch from the offline configuration to the online configuration if the power unit 2260 of the qualification device 2200 indicates to the processing unit 2230 of the qualification device 2200 that the level of energy of the qualification device 2200 is equal or higher than a predetermined threshold;
- h. to switch from the online to the offline configuration during a predetermined period of the day and/or of the night;
- i. to switch from the offline configuration to the online configuration during a predetermined period of the day and/or of the night;
- j. to switch from the online to the offline configuration if the communication unit 2220 of the qualification device 2200 receives a request from at least one qualification server 3000 and/or from at least one another qualification device 2100 to switch to the offline configuration.

By switching between its online and offline configuration, the qualification device 2200 can reduce the amount of data exchanged with a qualification server 3000 and/or with another qualification device 2100. Indeed, one of the major problems servers can have in the prior art is the amount of data received and sent that generate an overload on the bandwidth of the communication network and at the same time can cause an overload of the data to be treated by servers.

By switching between its online and offline configuration, the qualification device 2200 can reduce the quantity of energy used by the qualification device 2200, for example when the power unit uses a battery to electrically charge the qualification device 2200.

According to an embodiment, the qualification unit 2250 of the qualification device 2200 is configured to qualify, i.e. to validate, at least a first communication device 1100 and/or a second communication device 1200, 1300 and/or data to be transferred and/or a data transfer. The qualification unit 2250 can use several and different processes to qualify communication devices 1100, 1200, 1300, data and data transfers.

Said qualification unit 2250, according to a preferred embodiment and as previously described, comprises at least one accumulator; advantageously, said accumulator storing aggregated digital states hashes of a plurality of communication devices 1100, 1200, 1300. According to an embodiment, an accumulator is considered in this invention as a cryptographic accumulator as described in Cryptographic Accumulators: Definitions, Constructions and Applications, Nelly Fazio and Antonio Nicolosi, G22.3033-010—Topics in Cryptography, Instructor: Prof. Victor Shoup, Term: Fall 2002.

According to an embodiment, said accumulator, preferably, is configured on the qualification device 2200 to store a plurality of aggregated digital state hashes. Advantageously, the qualification unit 2250 is configured to allow a communication device's new aggregated digital state hash to be updated in said accumulator only if the new aggregated digital state hash of said communication device evolves from an aggregated digital state hash of said communication device that is currently, i.e. already, stored in said accumulator, i.e. if the new aggregated digital state hash of said communication device is at least partially based on an aggregated digital state hash of said communication device that is currently stored in said accumulator, i.e. if the new aggregated digital state hash of said communication device is calculated based on an aggregated digital state hash of said communication device that is currently stored in said accumulator.

According to another embodiment, when an aggregated digital state hash of a communication device 1100, 1200, 1300 is replaced by an updated aggregated digital state hash, for example during and/or after a data transfer, said aggregated digital state hash is put in a list of previous aggregated digital state hashes. Said list of previous aggregated digital state hashes comprise a plurality of aggregated digital state hashes, more precisely a plurality of previous aggregated digital state hashes, of a plurality of communication devices 1100, 1200, 1300. Said list of previous aggregated digital state hashes is preferably stored in the storage unit 2240 of the qualification device 2200.

According to an embodiment, a at least triply signed receipt references an aggregated digital state hash that is preferably transmitted with it, for example like an attachment. Preferably, the qualification unit 2250 is configured to extract from the transmission of said at least triply signed receipt the associated aggregated digital state hash.

According to an embodiment, the qualification unit 2250 comprises at least one filter. Said filter, preferably, comprises said list of previous aggregated digital state hashes. Said filter, advantageously, is configured to check if an updated aggregated digital state hash sent by a communication device 1100, 1200, 1300 is comprised by said list of previous aggregated digital state hashes, preferably to prevent transferring twice the same data, i.e. the same set of data, preferably to prevent a communication device 1100, 1200, 1300 to send the same data twice. For example, according to an embodiment of the present invention, a communication device 1100, 1200, 1300 can send only one-time a given data and/or set of data.

According to an embodiment, the qualification unit 2250 comprises at least one list of unexplained aggregated digital state hashes. Said list of unexplained aggregated digital state hashes, corresponding to unexplained aggregated digital states, can be stored in the storage unit 2240 of the qualification device 2200. Said unexplained aggregated digital state hashes comprise aggregated digital state hashes that do not correspond to aggregated digital states evolving from at least one aggregated digital state stored in the accumulator of the qualification device in its hash form. Each time a communication device 1100, 1200, 1300 sends to a qualification device 2200 an aggregated digital state hash that is not based on an aggregated digital state hash described by the accumulator stored in the storage unit 2240 of the qualification device 2200, said aggregated digital state hash is put on said list of unexplained aggregated digital states hashes.

According to an embodiment, the qualification unit 2250 comprises a reputation processing module. Said reputation processing module is advantageously configured to evaluate the reputation of at least one communication device 1100, 1200, 1300 to decide about whether to qualify it. According to a preferred embodiment, said reputation processing module is configured to execute a reputation algorithm.

For example, said reputation processing module, preferably said reputation algorithm, can comprise an artificial intelligence algorithm. According to an embodiment, said artificial intelligence algorithm can comprise a machine learning algorithm. For example, said machine learning algorithm can use a decision tree based on several parameters such as location of the qualification device 2200, location of the communication devices 1100, 1200, 1300, time of the data transfer, nature of the data to be transferred, quantity of the data to be transferred, etc. Preferably, this tree can be automatically and continuously tuned using a feedback loop that reports the positive and negative correlations between different weights for different factors and/or parameters, and the observed accuracy of predictions. This could estimate for example the risk of the data transfer, preferably using anonymous data related to said data transfer.

According to an embodiment, the qualification unit 2250 comprises a compliance module. Said compliance module is configured to communicate with at least one compliance server. Said compliance module is configured to authorize or not a given transfer of data based on predetermined compliance rules. For example, said predetermined compliance rules can stipulate that only communication devices that belong to users meeting an age, citizenship, consent, or membership requirement are allowed to transfer data. These predetermined compliance rules can also stipulate that under certain conditions, records of the transaction can be kept and reported for auditing purposes.

According to an embodiment, the qualification unit 2250 comprises at least one deny-list. According to an embodiment, said deny-list can comprise a list of unauthorized digital state hashes, for example, digital states that have already been seen as the input to a previous data transfer, and thus should be rejected to prevent additional data transfers of singly transferred data. The deny list can also enumerate communication devices, also called unauthorized communication devices. Said unauthorized communication devices correspond to communication devices, and/or communication devices being in a particular digital state, that are not authorized to send and/or receive data, preferably to and/or from one or several other communication devices. Preferably, this deny-list can be optimized with a data structure such as a Bloom Filter. According to an embodiment where the invention embodies a requirement that a given transfer of data can only occur once, the qualification unit 2250 preferably adds to this deny list the pair of digital state hashes that characterize each communication device's end digital state once the data transfer is complete, such that the same data transfer could not be repeated a second time. Said deny-list of unauthorized communication devices is preferably stored in the storage unit of the qualification unit. According to an embodiment, the updating data can comprise instructions to add and/or remove a given item and/or a given digital state hash and/or a given communication device from said deny-list.

According to an embodiment, the start digital state of a communication device relates to its aggregated digital state before the data transfer, and the end digital state of a communication device relates to its aggregated digital state after the data transfer.

According to an embodiment, the qualification unit 2250 comprises at least one inventory. Said inventory comprises preferably a list of authorized communication devices and/or authorized aggregated digital state hashes. Said list of authorized communication devices is preferably stored in the storage unit of the qualification device. Said authorized communication devices correspond to communication devices, and/or communication devices being in a particular digital state, that are authorized to send and/or receive data, preferably to and/or from one or several other communication devices. According to an embodiment, the updating data can comprise instructions to add and/or remove a given communication device from said inventory. Advantageously, when a communication device is removed from an inventory of a given qualification device, it is added to a deny-list of said given qualification device. Preferably, when a communication device is removed from a deny-list of a given qualification device, it is added to an inventory of said given qualification device.

According to an embodiment, the qualification device 2200 is configured to qualify, i.e. validate, a data transfer with respect to a communication device 1100, 1200, 1300 using the following process comprising at least the following steps.

a. receiving by the qualification device 2200 from a communication device 1100 an aggregated digital state hash, and b. verifying by the qualification unit 2250 that said aggregated digital state hash belongs to and/or is described by at least one accumulator stored by the storage unit 2240 of the qualification device 2200, i.e. evolves from an aggregated digital state described by an accumulator stored by the storage unit 2240 of the qualification device 2200 and/or is recognized as a valid digital state as held in an accumulator stored by the storage unit 2240 of the qualification device 2200;

i) if the aggregated digital state hash does not belong to said accumulator, i.e. does not evolve from the aggregated digital state hash comprised by the accumulator, i.e. is not described by the aggregated digital state hash comprised by the accumulator:

the qualification device 2200 invites the communication device 1100 to produce a sequence of data, preferably, using at least triply signed receipts that reference a chain of previous state hashes, that demonstrates that said aggregated digital state hash is based on an aggregated digital state belonging to said accumulator, and preferably stored in said accumulator in its hash form;

if the communication device 1100 does not provide the qualification device 2200 with said sequence of data, the aggregated digital state hash of the communication device 1100 is saved in a list of unexplained aggregated digital state hashes stored in the qualification device 2250, preferably in the storage unit 2240 of the qualification device 2200, then the transfer of data is stopped between said communication device 1100 and another communication device 1200, 1300, preferably, the transfer of data is not executed between said communication device 1100 and another communication device 1200, 1300;

ii) if the communication device 1100 provides the qualification device 2200 with said sequence of data or if the aggregated digital state hash belongs to said accumulator;

the qualification unit 2250 checks if said aggregated digital state hash is listed in its deny list of previously unauthorized digital state hashes and/or unauthorized communication devices, stored in the qualification unit, preferably in the storage unit of the qualification unit;

(a) if said aggregated digital state hash is listed in said deny list, and preferably if the present invention is operating in a mode where repeated transfers are disqualified, then the data transfer may be disqualified, i.e. cancelled. According to an embodiment, if the deny list is probabilistic, e.g. because it is embodied in a Bloom Filter, the qualification unit 2250 can offer to the communication device 1100 an opportunity to prove that the match in the deny list is a false positive result, i.e. the qualification device 2200 can send a request to the communication device 1100 to prove that the match in the deny list is a false positive result. For example, this can be done as follows:

i. the qualification device 2200 invites the communication device 1100 to submit the at least triply signed receipt for the data transfer that produced the digital state hash that the communication device claims is valid, i.e. the last at least triply signed receipt that has been stored in the storage unit 1140 of the communication device 1100; the qualification device 2200 invites the communication device 1100 to submit at least one previous aggregated digital state hash related to said at least triply signed receipt. If the communication device 1100 does not provide the qualification device 2200 with said previous aggregated digital state hash and said at least triply signed receipt, then the transfer of data is stopped between said communication device 1100 and another communication device 1200, 1300, preferably, the transfer of data is not executed between said communication device 1100 and another communication device 1200, 1300; and ii. if an at least triply signed receipt is provided by the communication device 1100 to the qualification device 2200, then besides comprising the hash of the end digital state for the communication device 1100, the at least triply signed receipt comprises at least three additional digital state hashes—one for the start digital state of the communication device 1100, and two for the start digital state and end digital state of the other communication device 1200, 1300 that participated in the previous data transfer. Preferably, the at least triply signed receipt can also comprise a hash of updating data that the communication device 1100 has received from a previous qualification device 2100 as part of the data transfer associated with said at least triply signed receipt. Advantageously, this allows the qualification unit 2250 to request the updating data, for example if it has not seen them before; and iii. upon receiving the at least triply signed receipt, the qualification device 2200 preferably first checks whether the at least triply signed receipt's two listed start digital state hashes appear in the qualification device's 2200 deny list. According to an embodiment, this is the case, if the previous data transfer is one that the qualification device 2200 has learned of through its own direct experience, i.e. through data transfers that the qualification device managed, or through updating data. If neither digital state hash appears, then the receipt represents entirely unfamiliar history that the qualification unit 2250 can't evaluate without further information, so it recurses to step i above by inviting the communication device 1100 to submit the preceding at least triply signed receipt, i.e. the at least triply signed receipt for the data transfer that produced the input to the triple-signed receipt under analysis. If only one of the two digital state hashes match the deny list, then the other match is assumed to be a false positive, and the same recursive behavior is also triggered. If both start digital state hashes match the deny list, then analysis proceeds to step iv.

iv. the qualification unit 2250 next checks the presented at least triply signed receipt to see whether the hash for the end digital state of the other communication device 1200, 1300 maps to the deny list. If it does not, then an innocent false positive for the current communication device 1100 has been proved since the qualification unit 2250 preferably adds digital state hashes to its deny list in pairs. The data transfer is allowed, and any knowledge that the qualification unit 2250 gained about previously unseen digital state hashes is used to make appropriate updates to its deny list.

v. if the hash for the end digital state of the other communication device 1200, 1300 maps to the deny list, then there is a chance of another false positive, but it is preferably exponentially smaller. The qualification device 2200 can end the analysis by denying the data transfer, or it can recurse to step i above.

(b) if the calculated aggregated digital state hash is not listed in said list of previous aggregated digital states hash or in the deny-list, or if the aggregated digital state hash is not listed in said list of previous aggregated digital states or in the deny-list, preferably in its hash form, the qualification unit 2250 validates the communication device 1100, and preferably allows the data transfer between the communication device 1100 and at least another communication device 1200, 1300.

Advantageously, said qualification process is also applied to the other communication device 1200, 1300 implied in the data transfer with the first communication device 1100.

According to an embodiment an at least triply signed receipt comprises at least the hash of the end digital state for the communication device, the hash of the start digital state of the communication device, and the hash for the start digital state of the other communication device that participated in the previous data transfer and the hash of the end digital state of the other communication device that participated in the previous data transfer.

According to an embodiment, the qualification device 2200 is configured to qualify a communication device 1100, 1200, 1300 using a reputation process comprising at least the following steps:
  a. the communication device 1100, 1200, 1300 presents to the qualification device 2200 an identifier for itself and proves that it controls this identifier by signing a challenge with the identifier's key; and
  b. the communication device 1100, 1200, 1300 presents to the qualification device 2200 evidence that it has used this identifier for itself in previous reputation-building interactions. Preferably, the communication device 1100, 1200, 1300 can do this with a Fiat-Shamir heuristic, as a preferred embodiment. According to another embodiment, a simple tamper-proof list of previous interactions can be used; and
  c. the qualification unit 2250 then evaluates the reputation of the identifier using one of several mechanisms. The simplest embodiment can be one where the qualification unit 2250 maintains a mapping that provides a numeric reputation score for each identifier. Another embodiment is that the qualification unit 2250 consults an oracle, i.e. a server. Another alternative embodiment is that the qualification unit 2250 uses a Fiat-Shamir heuristic to evaluate evidence of past behavior from the communications device 1100, 1200, 1300, and computes the numeric reputation score directly from this evidence. According to an embodiment, multiple dimensions of reputation can each have a numeric score, and the qualification unit 2250 can combine them into a single aggregate number. For example, one aspect of reputation can track how often the communication device 1100, 1200, 1300 experiences timeouts and other errors; another aspect of reputation can track how often a communication device 1100, 1200, 1300 has requested transfers in the past, but been denied for lack of evidence about its claimed digital state; preferably, if the reputation score passes a certain predetermined threshold, the qualification unit 2250 accepts the request to transfer; otherwise, the request is rejected.

According to an embodiment, the storage unit 2240 of the qualification device 2200 is configured to store updating data 200. Preferably, said storage unit 2240 is configured to store a log file. Said log file comprises preferably a list of the communication device digital state hashes that have been invalidated by recent data transfers. These hashes are preferably added in pairs to the deny list of a given qualification unit 2250, since each data transfer invalidates the old digital state hashes of both sender and receiver, i.e. of both communication devices 1100, 1200, 1300 implied in the data transfer. Said log file is advantageously configured to be synchronized when said qualification device 2200 communicates with at least one qualification server 3000 and or another qualification device 2100.

As discussed hereafter, the storage unit 2240 can comprise an accumulator, a filter, a list of unexplained aggregated digital states, a reputation processing module, preferably at least a reputation algorithm, a compliance module, preferably at least a predetermined compliance rule, a deny-list, an inventory.

According to an embodiment, the log file can comprise an accumulator, a filter, a list of unexplained aggregated digital states, a reputation processing module, preferably at least a reputation algorithm, a compliance module, preferably at least a predetermined compliance rule, a deny-list, an inventory.

According to an embodiment, the processing unit 2230 of the qualification device 2200 is configured to execute authenticated encryption techniques.

According to an embodiment, the processing unit 2230 of the qualification device 2200 is configured to generate at least one response to at least one challenge requested by at least a communication device 1100, 1200, 1300. According to said embodiment, said processing unit 2230 is configured to digitally sign said response, preferably in real-time, advantageously during the same communication session with said communication device 1100, 1200, 1300. This allows the qualification device 2200 to be authenticated by said communication device 1100, 1200, 1300.

According to an embodiment, the qualification device 2200 comprises a private key associated with a public key, said private key being used to digitally sign a challenge.

According to an embodiment, the processing unit 2230 of the qualification device 2200 is configured to generate at least one response to at least one challenge requested by at least a qualification server 3000 and/or another qualification device 2100. According to said embodiment, said processing unit 2230 is configured to digitally sign said response, preferably in real-time, advantageously during the same communication session with said qualification server 3000 and/or another qualification device 2100. This allows the qualification device 2200 to be authenticated by said qualification server 3000 and/or another qualification device 2100.

According to an embodiment, the processing unit 2230 of the qualification device 2200 is configured to generate at least one challenge to authenticate at least a communication device 1100, 1200, 1300, preferably using the authentication unit. Said challenge is preferably generated by the processing unit 2230 of the qualification device 2200 and send to said communication device 1100, 1200, 1300 by the communication unit 2220 of the qualification device 2200. The processing unit is configured preferably to request said communication device 1100, 1200, 1300 to digitally sign said challenge, preferably in real-time, advantageously during the same communication session between the qualification device 2200 and said communication device 1100, 1200, 1300, and to send back to it the digitally signed challenge, in order to authenticate said communication device 1100, 1200, 1300.

According to an embodiment, the processing unit 2230 of the qualification device 2200 is configured to generate at least one challenge to authenticate at least a qualification server 3000 and/or another qualification device 2100, preferably using the authentication unit 2210. Said challenge is preferably generated by the processing unit 2230 of the qualification device 2200 and send to said qualification server 3000 and/or said another qualification device 2100 by the communication unit 2220 of the qualification device 2200. The processing unit 2230 is configured preferably to request said qualification server 3000 and/or said another qualification device 2100 to digitally sign said challenge, preferably in real-time, advantageously during the same communication session between the qualification device 2200 and said qualification server 3000 and/or said another qualification device 2100, and to send back to it the digitally signed challenge, in order to authenticate said qualification server 3000 and/or said another qualification device 2100.

The processing unit 2230 is advantageously configured to update the qualification unit 2250 using updating data 200. When the qualification device 2200 receives updating data 200 from a communication device 1100, 1200, 1300 and/or a qualification server 3000 and/or another qualification device 2100, its processing unit 2230 is configured to use these updating data 200 to update at least one among:

a. an accumulator;
b. a filter;
c. a list of unexplained aggregated digital states;
d. a reputation processing module, preferably at least a reputation algorithm.
e. a compliance module, preferably at least a predetermined compliance rule;
f. a deny-list;
g. an inventory.

According to an embodiment, the processing unit 2230 of the qualification device 2200 is configured to verify the consistency of at least one at least triply signed receipt 300, preferably received from at least one communication device 1100, 1200, 1300. Advantageously, the processing unit 2230 is configured to verify the validity of data transferred between at least a first communication device 1100 and a second communication device 1200, 1300.

Advantageously, the processing unit 2230 is configured to qualify the data to be transferred and/or said first 1100 and second 1200, 1300 communication devices and/or the data transfer itself, preferably using said qualification unit 2250.

According to an embodiment, the processing unit 2230 of the qualification device 2200 is configured to digitally sign at least one receipt, preferably previously signed by at least a first communication device 1100 and a second communication device 1200, 1300, forming an at least triply signed receipt 300. Preferably, the processing unit 2230 of the qualification device 2200 is configured to digitally sign updating data 200, preferably new updating data, configured to be sent to at least one among the first communication device 1100 and the second communication device 1200, 1300, advantageously to both of them. The processing unit 2230 of the qualification device 2200 is configured to insert at least a reference of said updating data 200 in said at least triply signed receipt. The processing unit 2230 of the qualification device 2200 is preferably configured to send, using its communication unit 2220, to a first communication device 1100 and to a second communication device 1200, 1300 at least new updating data 200 being configured to update another qualification unit of at least another qualification device 2100. According to an embodiment, the processing unit 2230 of the qualification device 2200 is configured to send, using the communication unit 2220, to at least one qualification server 3000 and/or to at least one another qualification device 2100 at least new updating data 200 being configured to update another qualification unit of at least another qualification device 2100. Preferably, said updating data 200 comprise data designed to update another qualification device 2100 regarding the data transfer that has been realized between said first communication device 1100 and said second communication device 1200, 1300, and preferably regarding previous data transfers wherein said qualification device 2200 has been involved. For example, said updating data 200 comprise an updated accumulator. Said updated accumulator preferably comprises at least one new aggregated digital state hash, preferably a new aggregated digital state hash of the first communication device 1100 and a new aggregated digital state hash of the second communication device 1200, 1300. Preferably, said updating data 200 comprise a numeric operand which, when mathematically combined with a current accumulator value, produces an updated accumulator. Said numeric operand is preferably configured to update a previous accumulator based on at least one new aggregated digital state hash, preferably based on a new aggregated digital state hash of the first communication device 1100 and on a new aggregated digital state hash regarding the second communication device 1200, 1300. For example, said updating data 200 comprise a delta to an accumulator. Said delta preferably comprises at least one new aggregated digital state hash, preferably a new aggregated digital state hash of the first communication device 1100 and a new aggregated digital state hash regarding the second communication device 1200, 1300.

According to an embodiment, each time a set of data is transferred from a communication device 1100 to another communication device 1200, 1300, for example from the first communication device 1100 to the second communication device 1200, then the digital state of each of the communication devices 1100, 1200 involved in said data transfer is modified, preferably updated. For example, when the first communication device 1100 sends a set of data to the second communication device 1200, the digital state of the first communication device 1100 changes in order to take into account that this set of data has been sent, and preferably that this set of data has been sent to the second communication device 1200. In the same way, when the second communication device 1200 receives a set of data from the first communication device 1100, the digital state of the second communication device 1200 changes in order to take into account that this set of data has been received, and preferably that this set of data has been received from the first communication device 1100.

Preferably, each time a set of data is sent or received by a communication device 1100, 1200, 1300, its digital state changes. Advantageously, each time a set of data is sent or received by a communication device 1100, 1200, 1300, its aggregated digital state changes, i.e. a new aggregated digital state is generated based on at least the previous aggregated digital state and the at least triply signed receipt 300 related to the transfer of this set of data.

According to a preferred embodiment, the processing unit 2230 of the qualification device 2200 is configured to generate updating data 200 based on the data transfer between a first communication device 1100 and a second communication device 1200. Preferably, these updating data 200 are based on the accumulator of the qualification device 2200 and the at least triply signed receipt 300 related to the transfer of data between the first communication device 1100 and the second communication device 1200. Advantageously, the updating data 200 comprises data configured to update an accumulator of another qualification device in order to be aware of the at least triply signed receipt 300 of the data transfer between the first communication device 1100 and the second communication device 1200, as well as the new aggregated digital state of the first communication device 1100, preferably using the hash of the new aggregated digital state of the first communication device 1100, and the new aggregated digital state of the second communication device 1200, preferably using the hash of the new aggregated digital state of the second communication device 1200.

According to an embodiment, the processing unit 2230 of the qualification device 2200 is configured to generate a log file, as previously described. Then, the processing unit 2230 is configured to send, using the communication unit 2220, said log file, or at least a portion of said log file, to at least one qualification server 3000, 3100, 3200, 3300 and/or at least one another qualification device 2100.

According to an embodiment, the power unit 2260 of the qualification device 2200 is configured to provide electricity to the qualification device 2200, preferably to all the units of the qualification device 2200.

According to an embodiment, the power unit 2260 of the qualification device can be configured to power the first communication device 1100 and/or the second communication device 1200, 1300, in a wired way and/or wirelessly.

According to an embodiment, the qualification device 2200 is configured to:
a. preferably, authenticate at least a first communication device 1100 and a second communication device 1300, and preferably at least another qualification device and/or at least one qualification server; and
b. receive, from said first communication device 1100, at least:
   i) a list of data to be transferred to said second communication device 1300 and/or to said first communication device 1100, preferably a list of data related to a set of data to be transferred from the first communication device 1100 to the second communication device 1200 and/or preferably a list of data related to a set of data to be transferred from the second communication device 1200 to the first communication device 1100; and
   ii) preferably, a first at least triply signed receipt, also called a previous at least triply signed receipt, preferably corresponding to a previous data transfer including said first communication device 1100, said first at least triply signed receipt comprising:
      a digital signature of said first communication device 1100; and
      a digital signature of another communication device 1200; and
      a digital signature of another qualification device 2100; and
      digitally signed updating data, and/or a hash of said digitally signed updating data, said updating data being digitally signed by said another qualification device 2100; and
   iii) updating data 200a, said updating data 200a corresponding to said signed updating data, and preferably sent from said another qualification device 2100 to said first communication device 1100, said updating data 200a being configured to update the qualification unit 2250 of the qualification device 2200; and
c. use the updating data 200a to update its qualification unit 2250; and d. validate, using its qualification unit 2250, of at least one among the data to be transferred, the first communication device 1100 and the second communication device 1300, the data transfer; and
e. authorize the transfer of data from the first communication device 1100 to the second communication device 1300, if the qualification unit 2250 validates said data transfer; and
f. preferably, send a confirmation of validation to the first communication device 1100 to send said set of data to the second communication device 1300; and
g. preferably, send a confirmation of validation to the second communication device 1300 to receive said set of data from the first communication device 1100; and
h. receive a new receipt, intended to have at least three signatures, but initially signed preferably only by the first communication device 1100 and by the second communication device 1200; and
i. verify the new receipt and, if it has proper signatures from for example the two communication devices 1100, 1300, generate and sign at least new updating data based on at least a data transfer between the first communication device 1100 and the second communication device 1300; and
j. insert a reference of said new updating data in said new receipt, preferably adding a hash of the updating data, or the updating data itself, to the digital receipt, and then digital sign the receipt to make it at least triply signed; and
k. preferably, send said new updating data to the first communication device 1100 and to the second communication device 1300; and
l. send the new at least triply signed receipt to the first communication device 1100 and to the second communication device 1300 and to store it in its storage unit 2240.

According to an embodiment, the present invention relates to a computer program comprising instructions which, when the program is executed by the processing unit of a qualification device, cause the processing unit to carry out the previous described steps a to l.

According to an embodiment, the present invention relates to a computer-readable storage medium comprising instructions which, when the program is executed by the processing unit of a qualification device, cause the processing unit to carry out the previous described steps a to l.

Advantageously, the qualification device brings trust in the transfer of data between the first communication device and the second device. According to an embodiment, the qualification device allows to check if the first communication device is allowed to send data, preferably to the second communication device, and the qualification device allows to check if the second communication device is allowed to receive data, preferably from the first communication device. Preferably, the qualification allows the update of other qualification devices either over at least one qualification server when the qualification device is in its online configuration or using the first and the second communication devices to carry updating data to other qualification devices.

According to an embodiment, the qualification device can comprise at least one material-based security feature. Said material-based security feature is configured to allow at least a communication device and/or another qualification device to authenticate the communication device. According to an embodiment, said material-based security feature can comprise a seal that must be destroyed to open the outer case of the qualification device. According to a preferred embodiment, said material-based security feature can comprise a security fuse or dead-man's switch to render the qualification device tamper-evident at time of manufacture.

Preferably, said material-based security feature can comprise a seal on the case or housing of the device, such that any attempt to open or tamper with the device breaks the seal and causes its physical characteristics to change in a way that makes the device's integrity suspect, such that it can no longer be authenticated.

According to an embodiment, the qualification device can comprise at least one firmware security feature. Said firmware security feature is configured to allow at least a communication device and/or another qualification device to authenticate the communication device. Preferably, said firmware security feature can comprise a secure enclave that supports direct anonymous attestation for example.

According to an embodiment, the qualification device can comprise at least one firmware security feature. Said firmware security feature is configured to allow at least a communication device and/or at least another qualification device and/or at least a qualification server to authenticate the communication device. Preferably, said firmware security feature can comprise a digital signature by the original equipment manufacturer, attesting that the firmware had a certain configuration at the moment it left the manufacturer's custody. This can then be compared to the configuration of the firmware as it runs, in such a way that the firmware can prove its correctness if the configuration is unchanged and/or changed via approved methods, but cannot prove its correctness if the configuration has been tampered with. For example, direct anonymous attestation features used by many secure enclaves can be implemented.

According to an embodiment, the qualification device 2100, 2200 can be a smartphone, a tablet, a personal computer, a server, an IoT device, etc.

According to an embodiment, the qualification device 2100, 2200 can be configured to witness a transfer of tokens and/or any other data that can be owned only by one party at a time, from one communication device 1100 to another communication device 1200, 1300, preferably from a first communication device to a second qualification device.

Preferably, the qualification device 2100, 2200 is a device designed to not be moved from one location to another. A qualification device 2100, 2200 is configured to be attributed to a specific location.

Advantageously, the updating data 200a, 200b carried by a communication device 1100, 1200, 1300 are used by the qualification device 2200 to update its qualification unit 2250. Preferably, each time a communication device establishes a communication with a qualification device, updating data are sent from the communication device to the qualification device, when the qualification device is in its offline configuration and, preferably also in its online configuration.

Qualification Server According to the Present Invention

According to an embodiment, a qualification server 3000, 3100, 3200, 3300 is a server configured to communicate with at least one qualification device 2100, 2200, and preferably with at least one another qualification server 3000, 3100, 3200, 3300. The qualification server 3000, 3100, 3200, 3300 is configured to receive and/or send updating data to at least one qualification device 2100, 2200, and preferably to at least one another qualification server 3000, 3100, 3200, 3300. Preferably, a plurality of qualification servers 3000, 3100, 3200, 3300 communicates with each other in order to share these updating data 200 to allow a plurality of qualification device 2100, 2000 in communication with at least one of these qualification serves 3000, 3100, 3200, 3300 to be updated when said qualification device 2100, 2200 is in its online configuration.

System According to the Present Invention

Figure 3:
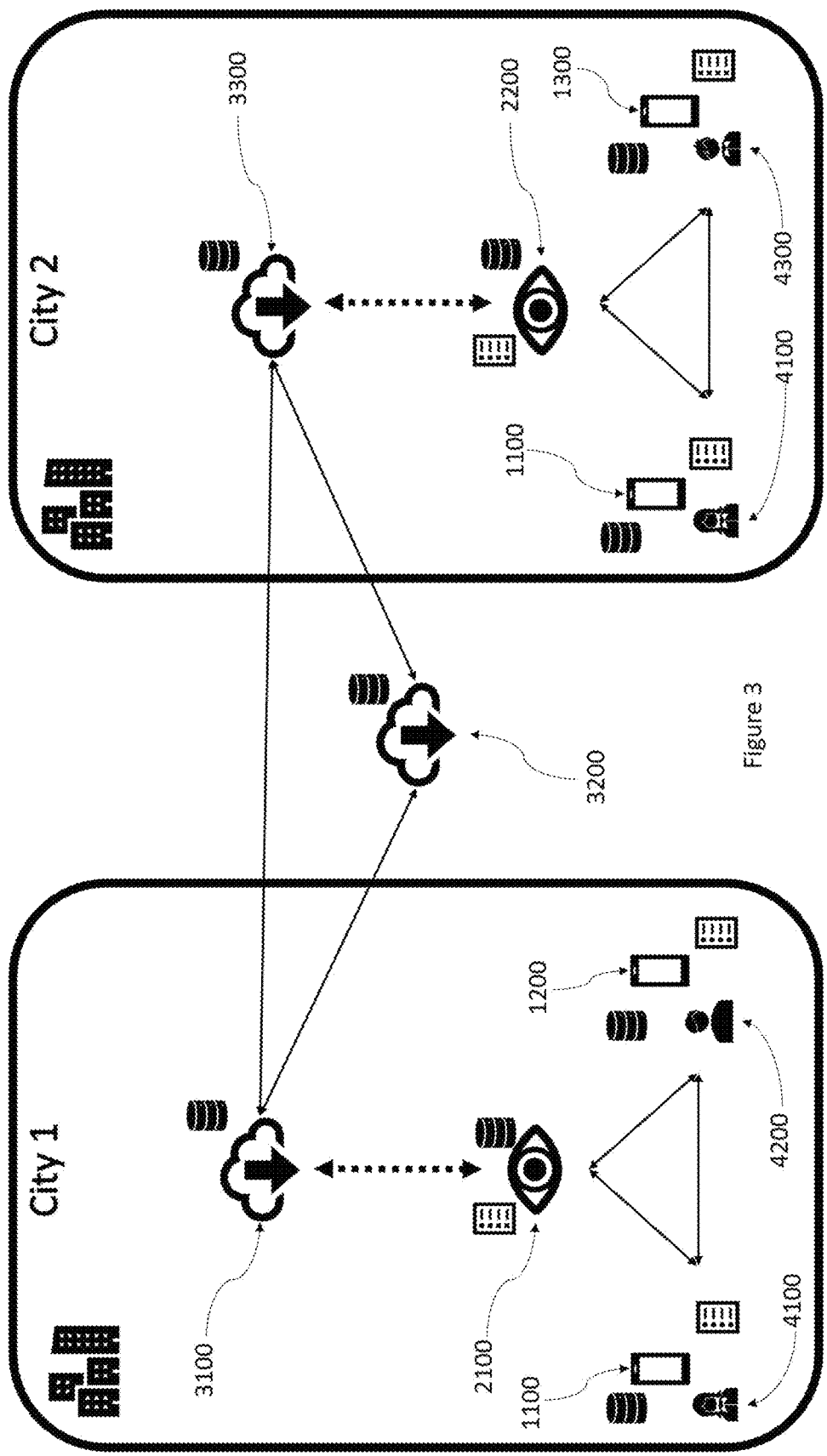
FIG. 3 is a schematic view of an example of implementation of the present invention.

The present invention relates to a system for transferring data between a first communication device and a second communication device, preferably of at least a plurality of communication devices, as previously described and as illustrated by FIGS. 1 and 3.

This system 100, preferably, comprises at least:
   a. a first communication device 1100, as previously described; and
   b. a second communication device 1200, as previously described;
   c. preferably, a first qualification unit 2100, as previously described;
   d. a second qualification unit 2200, as previously described;
   e. preferably, a qualification server 3000, as previously described.

This system 100 is configured such as:
   a. the first communication device 1100, the second communication device 1200 and the second qualification device 2200 are configured to authenticate each other preferably using an authentication encryption process. According to another embodiment:
      i) the first communication device 1100 is configured to send a challenge to the second qualification device 2200; and
      ii) preferably, the first communication device 1100 is configured to send a challenge to the second communication device 1200; and
      iii) the second communication device 1200 is configured to send a challenge to the second qualification device 2200; and
      iv) preferably, the second communication device 1200 is configured to send a challenge to the first communication device 1100; and
      v) preferably, the second qualification device 2200 is configured to send a challenge to at least one among the first communication device 1100 and the second communication device 1200, preferably to the first communication device 1100 and to the second communication device 1200; and
   b. preferably, the second communication device 1200 is configured to send a request to the first communication device 1100 to prepare a transfer of data from the first communication device 1100 to the second communication device 1200, preferably through the communication network, advantageously using the second qualification device 2200, more advantageously through the second qualification device 2200, and preferably through the short-range communication network; said data to be transferred being configured to be transferred only one time; said request comprising for example a list of data to be transferred; and/or preferably, the first communication device 1100 is configured to send a proposal to the second communication device 1100 to prepare a transfer of data from the first communication device 1100 to the second communication device 1200, preferably through the communication network, advantageously using the second qualification device 2200, more advantageously through the second qualification device 2200, and preferably through the short-range communication network; said data to be transferred being configured to be transferred only one time; said request comprising for example a list of data to be transferred; and c. preferably, the first communication device 1100 is configured to send to the qualification device 2200 at least:
  i) a list of data related to a set of data to be transferred from the first communication device 1100 to the second communication device 1200; and
  ii) preferably, a first at least triply signed receipt from a previous transfer, preferably if or when it is necessary to the qualification of the first communication device 1100 as previously discussed, comprising:
    a digital signature of the first communication device 1100; and
    a digital signature of another communication device; and
    a digital signature of a previous qualification device 2100 that was the last qualification device to approve a transfer involving the first communication device 1100; and
    digitally signed updating data, said updating data being digitally signed by the previous qualification device; and
  iii) updating data 200a, said updating data 200a coming from the previous qualification device 2100, said updating data 200a being configured to update the qualification unit 2250 of the qualification device 2200;
  iv) advantageously, at least a first aggregated digital state hash, said first aggregated digital state hash being configured to be used by the qualification unit to qualify said first communication device as previously described;

d. preferably, the second communication device 1200 is configured to send to the second qualification device 2200 at least
  i) the list of data to be transferred by the first communication device 1100 to the second communication device 1200, and
  ii) preferably, a second at least triply signed receipt from a previous transfer, preferably if or when it is necessary to the qualification of the second communication device 1200 as previously discussed, comprising:
    a digital signature of the second communication device 1200; and
    a digital signature of another communication device that was the last party with whom the second communication device transferred data, preferably different from the first communication device; and
    a digital signature of another qualification device that was the last qualification device to approve a transfer involving the second communication device 1200, preferably different from the second qualification device; and
    digitally signed updating data, said updating data having been digitally signed by said another qualification device; and
  iii) updating data 200b, said updating data 200b coming from said another qualification device, said updating data 200b being configured to update the qualification unit 2250 of a qualification device 2200, preferably of the second qualification device; and
  iv) advantageously, at least a second aggregated digital state hash, said second aggregated digital state being configures to be used by the qualification unit 2250 to qualify said second communication device 1200 as previously described; and e. the qualification device 2200 is configured to use the updating data 200, 200a, 200b to update its qualification unit 2250 as previously described; and f. the qualification device 2200 is configured to validate, using its qualification unit 2250, at least one among the data to be transferred, the first communication device 1100 and the second communication device 1200, the data transfer; and g. the qualification device 2200 is configured to authorize the transfer of data from the first communication device 1100 to the second communication device 1200, if the qualification unit 2250 validates said data transfer, preferably if the aggregated digital state hash of the first communication device 1100 is based on an aggregated digital state hash described by the accumulator of the qualification unit 2250 and/or if the aggregated digital state hash of the second communication device 1200 is based on an aggregated digital state hash described by the accumulator of the qualification unit 2250 and/or if the data transfer is validated by the reputation process previously discussed; and h. preferably, the qualification device 2200 is configured to send a confirmation of validation to the first communication device 1100 to send said set of data to the second communication device 1200; and i. preferably, the qualification device 2200 is configured to send a confirmation of validation to the second communication device 1200 to receive said set of data from the first communication device 1100; and j. the first communication device 1100 is configured to send said set of data to the second communication device 1200; and k. the second communication device 1200 is configured to receive and to verify a set of data related to said list of data from the first communication device 1100; and l. at least one among the first communication device 1100 and the second communication device 1200 is configured to generate a new receipt configured to be at least triply signed, to digitally sign it, and to send it to the other communication device among the first communication device 1100 and the second communication device 1200; and m. said other communication device among the first communication device 1100 and the second communication device 1200 is configured to receive said new receipt, to verify it, to digitally sign it, and to send it to the qualification device 2200; and n. the qualification device 2200 is configured to verify the new receipt; and o. the qualification device 2200 is configured to generate and sign updating data, insert a reference, preferably a hash, of the new updating data in the new receipt, and preferably send new updating data to the first communication device 1100 and to the second communication device 1200; and p. the qualification device 2200 is configured to digitally sign the new receipt completing it, i.e. forming an at least triply signed receipt, preferably forming a triple-signed receipt, to send it to the first communication device 1100 and to the second communication device 1200, preferably, when the qualification device 2200 digitally signs the new receipt, said new receipt becomes an at least triply signed receipt.

According to an embodiment, the first communication device 1100 is configured to sign an incompletely signed receipt and send it to a next party for additional processing. It can be the party that initiates the interaction, i.e. the data transfer, in which case, it generates the receipt and supplies the first signature; the next party that it targets is the second communication device 1200. If, on the other hand, the second communication device 1200 initiates the interaction, i.e. the data transfer, then the first communication device 1100 begins its work when it receives a singly signed receipt from the second communication device 1200. In such a case, it verifies the receipt, affixes a second signature, and sends it to the qualification device 2200 as the next party, preferably in the form of an at least doubly signed receipt.

According to an embodiment, the second communication device 1200 is configured to sign an incompletely signed receipt and send it to a next party for additional processing. It can either initiate or react, complementing the behavior of the first communication device 1100. If initiating, it generates, signs, and sends to the first communication device 1100 a singly signed receipt. If reacting, it verifies, signs, and sends to the qualification device 2200 an at least doubly signed receipt.

The present invention allows the transfer of data in an untrusted environment between a first communication device and a second communication device using a qualification device to qualify said data transfer, bringing trust in said untrusted environment.

According to an embodiment, a unit can comprise other units. Preferably, a module can comprise other modules. Advantageously, a module can comprise units.

Method According to the Present Invention

The present invention relates to a method for transferring data from a first communication device to a second communication device, preferably of at least a plurality of communication devices, using a first qualification device and a second qualification device.

According to an embodiment, the method comprises the following steps:

a. the first communication device, the second communication device and the second qualification device authenticate each other, preferably using an authenticated encryption process. According to another embodiment, the first communication device, the second communication device and the second qualification device authenticate each other using the following steps:
  i) the first communication device sends a challenge to the second qualification device, and
  ii) preferably, the first communication device sends a challenge to the second communication device; and
  iii) the second communication device sends a challenge to the second qualification device; and
  iv) preferably, the second communication device sends a challenge to the first communication device; and
  v) preferably, the second qualification device sends a challenge to at least one among the first communication device and the second communication, preferably to the first communication device and to the second communication; and b. preferably, the second communication device sends a request to the first communication device to prepare a transfer of data from the first communication device to the second communication device, preferably through the communication network, advantageously using the qualification device, for example through the qualification device, and preferably through the short-range communication network; said data to be transferred being configured to be transferred only one time; said request comprising for example a list of data to be transferred; and/or the first communication device sends a proposal to the second communication device to prepare a transfer of data, preferably from the first communication device to the second communication device, preferably through the communication network, advantageously using the qualification device, for example through the qualification device, and preferably through the short-range communication network; said data to be transferred being configured to be transferred only one time; said proposal comprising for example a list of data to be transferred; preferably communication occurs through the communication network; and c. preferably, the first communication device sends to the qualification device at least:
  i) a list of data related to a set of data to be transferred from the first communication device to the second communication device; and
  ii) advantageously, a first at least triply signed receipt from a previous transfer, preferably if or when it is necessary to the qualification of the first communication device as previously discussed, comprising:
    a digital signature of the first communication device; and
    a digital signature of another communication device; and
    a digital signature of a previous qualification device that was the last qualification device to approve a transfer involving the first communication device; and
    digitally signed updating data, said updating data being digitally signed by the previous qualification device; and
  iii) updating data, said updating data coming from the previous qualification device, said updating data being configured to update the qualification unit of the qualification device; and
  iv) advantageously, at least a first aggregated digital state hash, said first aggregated digital state hash being configured to be used by the qualification unit to qualify said first communication device as previously described; and d. preferably, the second communication device sends to the second qualification device at least:
  i) the list of data to be transferred by the first communication device; and
  ii) advantageously, a second at least triply signed receipt, preferably if or when it is necessary to the qualification of the first communication device as previously discussed, comprising.
    a digital signature of the second communication device; and
    a digital signature of another communication device that was the last party with whom the second communication device transferred data, preferably different from the first communication device; and
    a digital signature of another qualification device that was the last qualification device to approve a transfer involving the second communication device, preferably different from the second qualification device; and
    digitally signed updating data, said updating data having been digitally signed by said another qualification device, and iii) updating data, said updating data coming from said another qualification device, said updating data being configured to update the qualification unit of a qualification device, preferably of the second qualification device; and iv) advantageously, at least a second aggregated digital state hash, said second aggregated digital state hash being configured to be used by the qualification unit to qualify said second communication device as previously described; and e. the qualification device uses the updating data to update its qualification unit, as previously described; and f. the qualification device validates, using its qualification unit, at least one among the data to be transferred, the first communication device and the second communication device, the data transfer; and g. the qualification device authorizes the transfer of data from the first communication device to the second communication device, if the qualification unit validates said data transfer, preferably if the aggregated digital state hash of the first communication device is based on an aggregated digital state hash described by the accumulator of the qualification unit and/or if the aggregated digital state hash of the second communication device is based on an aggregated digital state hash described by the accumulator of the qualification unit and/or if the data transfer is validated by the reputation process previously discussed; and h. preferably, the qualification device sends a confirmation of validation to the first communication device to send said set of data to the second communication device; and i. preferably, the qualification device sends a confirmation of validation to the second communication device to receive said set of data from the first communication device; and j. the first communication device sends said set of data to the second communication device; and k. the second communication device receives a set of data related to said list of data from the first communication device and preferably verifies it; and l. at least one among the first communication device 1100 and the second communication device 1200 generates a new receipt configured to be at least triply signed, digitally signs it, and sends it to the other communication device of at least one among the first communication device 1100 and the second communication device 1200; and m. said other communication device of at least one among the first communication device 1100 and the second communication device 1200 receives said new receipt, verifies it, digitally signs it, and sends it to the qualification device 2200; and n. the qualification device verifies the new receipt; and o. the qualification device generates and signs updating data, inserts a reference, preferably a hash of the new updating data, in the new receipt, and preferably sends new updating data to the first communication device and to the second communication device; and p. the qualification device digitally signs the new receipt, completing it, i.e. forming an at least triply signed receipt, preferably forming a triple-signed receipt, sends it to the first communication device 1100 and to the second communication device 1200; advantageously, when the qualification device 2200 digitally signs the new receipt, said new receipt becomes an at least triply signed receipt.

The present invention allows the transfer of data in an untrusted environment between a first communication device and a second communication device using a qualification device to qualify said data transfer, bringing trust in said untrusted environment. The present invention allows to transfer a given data only one time from a first communication device to a second communication device, reducing, preferably avoiding, a double transfer of the same data from the same communication device.

According to an embodiment, the present invention relates to an updating method for updating a qualification unit of a qualification device using updating data carried by a communication device and coming from a previous qualification device.

Preferably, said updating method comprises the following steps:

a. receiving by the communication device updating data from said previous qualification device, and b. sending by the communication device said updating data to the qualification device; and c. receiving by the qualification device said updating data from the communication device; and d. updating the qualification unit of the qualification device by the processing unit of the qualification device using said updating data.

According to an embodiment, the updating data can comprise data to update the qualification process of the qualification unit. Preferably, the updating data can comprise data to update the reputation process of the qualification unit. Advantageously, the updating data can comprise data to update an inventory, a deny-list, a previous aggregated digital state hashes list or an unauthorized aggregated digital state hashes list.

Said method allows the qualification unit to be updated even if the qualification device is in its offline configuration, i.e. is not communicating with at least one qualification server and/or at least one another qualification device. Advantageously, the communication device is mobile and allows to update a qualification device that is not mobile and that is in a location wherein the qualification device cannot communicate with at least one qualification server and/or at least one another qualification device.

The present invention will now be described using not limiting examples of implementations.

Example 1: Transfers of Data Between Users

Figure 5:
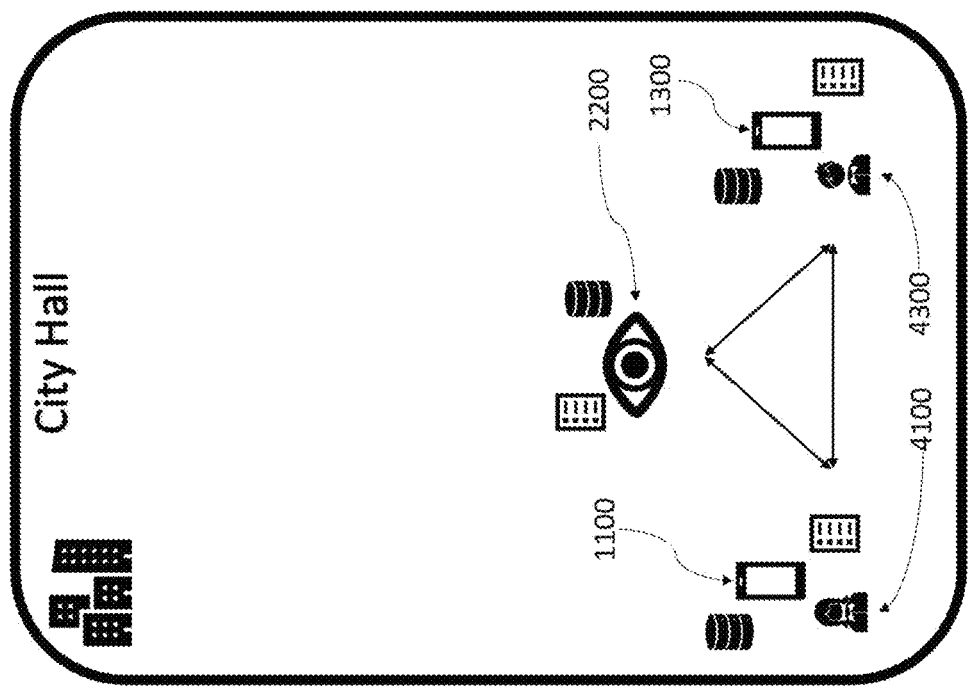
FIG. 5 is a schematic view of an example of implementation of the present invention.
Figure 5:
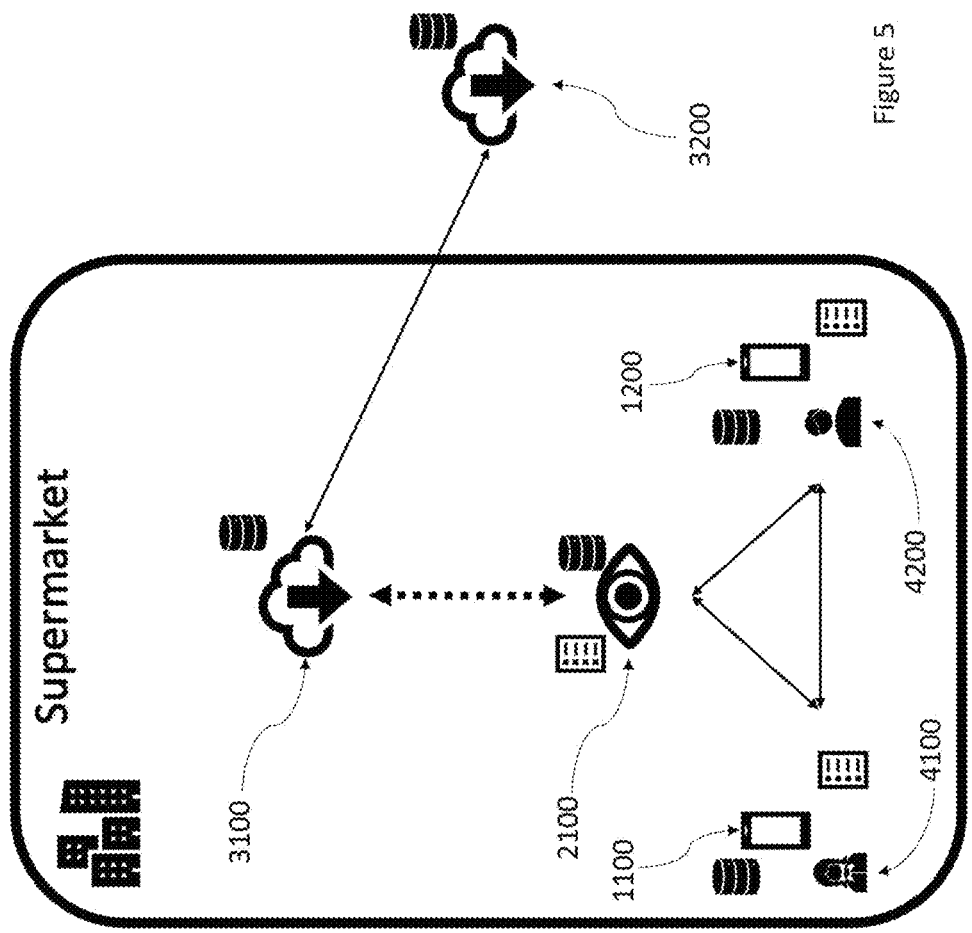

According to an embodiment, and as described in FIG. 5, the present invention can be implemented in an IoT environment wherein the communication devices 1100, 1200, 1300 can be smartphones and wherein the qualification device 2100, 2200 can be devices localized in different kinds of places such as supermarkets, subway stations or city halls or even banks.

According to this example, a first user 4100 carries with him a first communication device 1100, for example his smartphone, and goes to a supermarket to meet a second user 4200 carrying a second communication device 1200, for example his smartphone. At the supermarket the first user 4100 wants to send a set of data to the second user 4200, but, for example, they do not know each other very well, therefore, they use a qualification device 2100 to witness the data transfer, preferably to qualify the data transfer, i.e. to validate the data transfer. This set of data to be transferred can be transferred from the first communication device 1100 to another communication device only one time, for example; this set of data can comprise at least one NFT (Non fungible token) that can represent a piece of art or can be simply one or several tokens that can represent a certain amount of money, for example. According to an embodiment, this set of data can comprise a unique identifier number and/or a serial number of a package and/or a product that the first user 4100 has to give to the second user 4200. For example, the first user 4100 can be a delivery man having a package for the second user 4200 being for example a client. The second user 4200 wants to be sure that this package and/or this product has not been already given to another client, and that he is not paying for a non-authentic package and/or product. Indeed, the delivery of this given package by this given first user 4100 can only happen one time; the second user 4200, using the present invention, can be sure of that.

Therefore, the first user 4100 and the second user 4200 meet in the place where the qualification device 2100 is located. There, the first user 4100 uses the first communication device 1100 to authenticate the second communication device 1200, i.e. the second user 4200, and to authenticate the qualification device 2100. Before, after or even at the same time, the second user 4200 uses the second communication device 1200 to authenticate the first communication device 1100, i.e. the first user 4100, and to authenticate the qualification device 2100. These authentication steps can be realized using authenticated encryption and/or challenge-response interactions, such as for example signed responses to these challenges. This mutual authentication step can be realized over a communication network, preferably over a short-range communication network, for example using QR codes with cameras and displays, and/or using NFC technologies and/or Bluetooth technologies, for example.

Preferably, the first communication device 1100 receives a request from the second communication device 1200 to prepare for transfer of data through said communication network, preferably through the short-range communication network. Indeed, preferably, the second user 4200 uses the second communication device 1200, i.e. his smartphone, to send a request to the first communication device 1100, said request comprising for example a list of data to be transferred.

According to another embodiment, the first communication device 1100 sends a proposal to the second communication device 1200 to prepare for transfer of data through said communication network, preferably through the short-range communication network. Indeed, preferably, the first user 4100 uses the first communication device 1100, i.e. his smartphone, to send a proposal to the second communication device 1200, said proposal comprising for example a list of data to be transferred.

Then, the first communication device 1100 sends to the qualification device 2100 at least said list of data to be transferred and a first aggregated digital state hash. Depending on what updating data the qualification device 2100 has already seen, the first communication device 1100 can supplement this with first updating data as previously described, and/or with a first at least triply signed receipt. Preferably, this first at least triply signed receipt is configured to allow the qualification device 2100 to qualify the first communication device 1100, for example using data comprising in said first at least triply signed receipt. Advantageously, said first aggregated digital state hash is configured to allow the qualification device 2100 to qualify the first communication device 1100, i.e. to validate it. Preferably, said first aggregated digital state hash can be comprised by the first at least triply signed receipt. These first updating data are configured to allow the qualification device 2100 to be updated. These first updating data comprise preferably data to update an accumulator stored by the storage unit of the qualification device 2100.

Preferably, the second communication device 1200 sends to the qualification device 2100 at least said list of data to be transferred and a second aggregated digital state hash. Depending on what update data the qualification device 2100 has already seen, the second communication device 1200 may supplement this with second updating data as previously described, and/or with a second at least triply signed receipt. Preferably, this second at least triply signed receipt is configured to allow the qualification device 2100 to qualify the second communication device 1200, for example using data comprising in said second at least triply signed receipt. Advantageously, said second aggregated digital state hash is configured to allow the qualification device 2100 to qualify the second communication device 1200, i.e. to validate it. Preferably, said second aggregated digital state hash can be comprised by the second at least triply signed receipt. These second updating data are configured to allow the qualification device 2100 to be updated. These second updating data comprise preferably data to update an accumulator stored by the storage unit of the qualification device 2100.

According to said example, and as illustrated by FIG. 5, the qualification device 2100 can communicate with the first qualification server 3100. Preferably, if the qualification device 2100 is in its online configuration, its qualification unit is up to date. Nevertheless, according to an embodiment, the qualification device 2100 can check if its qualification unit is up to date using the first updating data and/or the second updating data.

For example, the qualification device 2100 uses these first updating data and/or these second updating data to update its qualification unit, advantageously using its processing unit. Then, with its qualification unit updated, the qualification unit executes different steps, as previously described, to validate the first communication device 1100 and the second communication device 1200 and/or the data transfer, using preferably also the list of data to be transferred and advantageously the first at least triply signed receipt and the second at least triply signed receipt.

Then, according to the output of the qualification process, the qualification device 2100 authorizes or not the transfer of data between the first communication device 1100. i.e. the smartphone of the first user 4100, and the second communication device 1200, i.e. the smartphone of the second user 4200. Preferably, if the first aggregated digital state hash derives from an aggregated digital state described by the accumulator of the qualification device 2100, advantageously after the update of said accumulator by the first and/or second updating data, then the first communication device 1100 is authorized to execute said data transfer. Preferably, if the second aggregated digital state hash derives from an aggregated digital state described by the accumulator of the qualification device 2100, advantageously after the update of said accumulator by the first and second updating data, then the second communication device 1200 is authorized to execute said data transfer. If the first and the second communication device 1100, 1200 are authorized to execute this data transfer, then data can be sent from the first communication device 1100 to the second communication device 1200. Advantageously, a step using a reputation process can also be implemented as previously described before validating or not the first communication device 1100 and/or the second communication device 1200.

Then, the first user 4100, using the first communication device 1100, sends a set of data corresponding to said list of data to the second user 4200, preferably to the second communication device 1200.

Then the second user 4200, using its smartphone, i.e. the second communication device 1200, receives said set of data, and preferably verifies said set of data. For example, the second communication device 1200 can check if said set of data is correctly related to said list of data.

Then a new receipt, preferably intended to become a new at least triply signed receipt, preferably a new triple-signed receipt in this example, is advantageously generated by one among the first communication device 1100, the second communication device 1200 and the qualification device 2100, preferably by the communication device 1100 that has sent the set of data, the first communication device 1100 in this not limiting example. Preferably, the first communication device 1100 generates a new receipt; the first communication device 1100 digitally signs said new receipt, and sends it to the second communication device 1200. Then, the second communication device 1200 verifies said new receipt, and if everything is valid, i.e. if the receipt correctly embodies the information required and related to the data transfer, the second communication device 1200 digitally signs the new receipt and sends it to the qualification device 2100.

Then, the qualification device verifies 2100 said new receipt. The qualification device 2100 generates new updating data. The qualification device 2100 signs said new updating data. The qualification device 2100 inserts a reference, preferably a hash of the new updating data, in the new receipt. The qualification device 2100 preferably sends these new updating data to the first communication device 1100 and to the second communication device 1200. For example, these new updating data comprise a new accumulator delta deriving for the accumulator of the qualification device 2100, preferably said new accumulator being delta calculated based on the accumulator of the qualification device 2100 and said new receipt, and advantageously the new aggregated digital state hash of the first communication device 1100 and the new aggregated digital state hash of the second communication device 1200. Indeed, this new accumulator is configured to describe the new aggregated digital state of the first communication device 1100 and the new aggregated digital state of the second communication device 1200. The qualification device 2100 digitally signs the new receipt forming a new at least triply signed receipt, sends it to the first communication device 1100 and to the second communication device 1200.

According to an embodiment, the qualification device 2100 can turn its configuration from an offline configuration to an online configuration to send these updating data to the first qualification server 3100 and/or to another qualification device. Preferably, the qualification server 3000 can share these updating data with a second qualification server 3200, advantageously to share these updating data with other qualification devices.

Now, the first communication device 1100 comprises a new aggregated digital state, the new at least triply signed receipt and the new updating data. In the same way, the second communication device 1200 comprises a new aggregated digital state, the new at least triply signed receipt and the new updating data.

These communication devices 1100, 1200 are therefore able to update any other qualification device using these new updating data. These communication devices 1100, 1200 are therefore able to be authenticated by another qualification device that would comprise an accumulator based on said new accumulator, i.e. describing the new aggregated digital state hashes of the first 1100 and the second 1200 communication devices.

According to this example the first user 4100 can travel to another city and can meet a third user 4300. This third user 4300 can comprise a third communication device 1300, in the form of a smartwatch for example.

In this another city, the third user 4300 is waiting for a set of data that the first user 4100 has to send him. This data transfer can for example take place in the city hall of said another city where a second qualification device 2200 is located. When the first user 4100 meets the third user 4300 near the new qualification device 2200 of the city hall. Said second qualification device 2200 is for example in its offline configuration because this another city is located on a mountain where there is no Internet connection or mobile phone network, for example. Then, here the first user 4100 uses his smartphone 1100 to communicate with the smartwatch 1300 of the third user 4300 and with the second qualification device 2200. As previously described and according to an embodiment, the first communication device 1100, the third communication device 1300 and the second qualification device 2200 authenticate each other. Then, the new updating data are downloaded from the first communication device 1100 by the second qualification device 2200 in order to update the qualification unit 2250 of the second qualification device 2200. As previous discussed, the second qualification device 2200 can learn about the existence of this updating data as it examines an at least triply signed receipt that the first communication device 1100 provides. Preferably, the second qualification device 2200 also downloads updating data from the third communication device 1300 to update its qualification unit 2250. As previous discussed, the second qualification device 2200 can learn about the existence of this updating data as it examines an at least triply signed receipt that the third communication device 1300 provides.

Then, according to the method previously described, a set of data is transferred from the first communication device 1100 to the third communication device 1300. This set of data is different from the one transferred from the first communication device 1100 to the second communication device 1200, otherwise, the second qualification device 2200 would have not authorized said transfer, preferably if the system is in a mode wherein a data or a set of data can be transferred only one time from a given communication device to another given communication device. Indeed, using the new updating data carried by the first communication device 1100, the second qualification device 2100 can update its qualification unit 2250, preferably its accumulator is updated. Advantageously, with this updated qualification unit 2250, the second qualification device 2200 is aware of the previous digital state of the first communication device 1100 and of its current state, i.e. the updated qualification unit 2250 of the second qualification device 2200 is aware of the data transfer between the first user 4100 and the second user 4200, i.e. between the first communication device 1100 and the second communication device 1200.

According to an embodiment, this set of data can comprise a unique identifier number and/or a serial number of a package and/or a product that the first user 4100 has to give to the third user 4300. For example, the first user 4100 can be a delivery man having a package for the third user 4300 being for example a client as the second user in a previous embodiment. The third user 4300 wants to be sure that this package and/or this product has not been already given to another client, such as to the second user 4200 for example, and that he is not paying for a non-authentic package and/or product. Indeed, the delivery of this given package by this given first user 4100 can only happen one time, the third user 4300, using the present invention, can be sure of that.

According to an embodiment, the first user 4100 can be a robot and/or the second user 4200 can be a robot and/or the third user 4300 can be a robot. According to said embodiment, each of these robots can be part of a delivery center, and the data transfers refer to transfer of package and/or product from one robot to another robot. According to an embodiment, at least one among of the users can be an institution exchanging data with other users such as robots, customers using their communication devices or even with other institutions.

The present invention allows a safe and trusted transfer of data between communication devices reducing the risk of double transfer of a same set of data, and advantageously in an offline environment.

Advantageously, the present invention can allow to check if a product to be delivered has been already or not delivered to another customer. The present invention can be implemented in various environment such as supply chain, delivery chain, etc. . . . The present invention allows to qualify data transfers, and if these data are related to non-virtual items, then the present invention allows to qualify the transfers of items associated to these data.

Example 2: Internet of Things Communications

According to a second example, the first communication device can be an autonomous drone or can be comprised by an autonomous drone. Said autonomous drone is configured to capture photographs and/or video and sensor data. This drone is preferably configured to deliver these photographs and/or video and these sensor data to a collection station. Said collection station is or comprises the second communication device. Said collection station is configured to collect photographs and/or video and sensor data from autonomous drones. According to said example, the qualification device is configured to interact with the first communication device, i.e. said autonomous drone, and the second communication device, i.e. said collection station.

Preferably, the qualification device is configured to guarantee integrity of data transfers between the first communication device, i.e. the autonomous drone, and the second communication device, i.e. the collection station, to mitigate risk of data being reported more than once.

According to an embodiment, the collection station wants to receive only once a given photograph and/or a given video and given sensor data. For example, the collection station can pay the autonomous drone for each photograph and/or video and/or sensor data that the autonomous drone deliver as far as these photographs and/or video and sensor data have not already been delivered by said autonomous drone. According to an embodiment, respectively said photograph and/or video and/or sensor data is respectively a verifiable photograph and/or a verifiable video and/or verifiable sensor data, preferably the verifiable nature of the photograph and/or video and/or sensor data prevents an autonomous drone from creating copies, advantageously trivial copies of said photograph and/or video and/or sensor data. For another example, the collection station can electrically recharge the autonomous drone for each photograph and/or video and sensor data that the autonomous drone deliver as far as these photographs and/or video and sensor data have not already been delivered by said autonomous drone. For another example, the collection station is part of an artificial intelligence system wherein for training purpose a photograph and/or a video and sensor data have to be collected only one time, due to some training parameters for example. Indeed, if a given data is collected more than one time, then it can affect the weight of this data in an artificial intelligence training process, for example.

According to an embodiment, the qualification device can interact with the autonomous drone and with the collection station using a LoRa network.

According to this example, the autonomous drone approaches the collection station and the qualification device. Once within range of transmission, the autonomous drone, the collection station and the qualification device authenticate one another. According to an embodiment, the qualification device can download updating data from at least one among the autonomous drone and the collection station to update, if needed, its qualification unit, preferably if the qualification device is in its offline configuration, as previously described. The autonomous drone then proposes to transfer data, these data comprising for example at least one photograph and/or video and/or sensor data. The autonomous drone sends a new receipt, signed only once by itself, to the collection station, said new receipt comprising information about its digital state hash. The collection station adds information about its digital state hash and then counter signs it and sends it to the qualification device, said new receipt is now an at least doubly signed receipt. The qualification device inspects this at least doubly signed receipt and triggers validation conversations with the autonomous drone and the collection station, preferably if the qualification device cannot map their claimed digital states, in the form of hashes, to the accumulator and/or the deny list that the qualification device is managing.

Once the data transfer has been validated, and preferably executed, the qualification device generates new updating data, signs them, inserts a hash of them into the at least doubly signed receipt, and signs this at least doubly signed receipt which becomes an at least triply signed receipt. Then, the qualification device transmits these updating data and this at least triply signed receipt to the autonomous drone and the collection station.

According to an embodiment, the first communication device and the second communication device can send data to the qualification device in any order. Preferably, the qualification device cannot affix its third signature until it validates all the inputs. However, according to an embodiment, the qualification device can recognize conditions that trigger escalating questions, e.g. challenges for previous at least triply signed receipts and updating data, while it is waiting for an at least doubly signed receipt to be submitted. Advantageously, the qualification device can conduct the reputation process and/or the qualification process with both the first communication device and the second communication device in parallel.

Example 3: Autonomous Car

According to a third example, the first communication device can be or can be comprised by an autonomous car. Said autonomous car comprises a predetermined number of tokens. These tokens are configured to allow the autonomous car to be electrically recharged in a charging station. The autonomous car is therefore configured to exchange a predetermined number of tokens against a predetermined quantity of electrical energy from said charging station. Said charging station is or comprises the second communication device. Said charging station is configured to deliver a predetermined quantity of electricity to charge an autonomous car in exchange of a predetermined number of tokens.

According to said example, the qualification device is configured to interact with the first communication device, i.e. said autonomous car, and the second communication device, i.e. said charging station.

As previously described, the qualification device is preferably configured to guarantee integrity of tokens transfers between the autonomous car and the charging station, to mitigate risk of tokens being exchanged more than once.

According to an embodiment, the qualification device is configured to check that the autonomous car is not exchanging the same tokens several time, indeed, the qualification device is configured to avoid double-spending situation. For example, a hacker can try to add to the storage unit of the first communication device tokens that have already been spent in order to increase his number of tokens. The qualification device can be configured to invalidate any tokens transfers from said first communication device if these tokens have already been spent by said first communication device, i.e. said autonomous car.

According to an embodiment, the charging station delivers a predetermined amount of electricity to the autonomous car only against valid tokens, i.e. tokens that have not been already spent by the autonomous car.

According to an embodiment, the qualification device can interact with the autonomous car and with the charging station using a short-range communication network.

According to this example, the autonomous car establishes a mechanical connection with the charging station configured to allow electricity to go from the charging station to the power unit of the autonomous car which comprises at least one battery, preferably as the same time, the autonomous car approaches to the qualification device. According to an embodiment, the qualification device can be comprised by the charging station. Preferably, the communication between the first communication device, i.e. the autonomous car, and the second communication device, i.e. the charging station, can be a wired communication. Advantageously, the communication between the first communication device, i.e. the autonomous car, and the qualification device can be a wired communication, and/or the communication between the second communication device, i.e. the charging station, and the qualification device can be a wired communication.

Once within range of transmission and or physically connected, the autonomous car, the charging station and the qualification device authenticate one another. According to an embodiment, the qualification device can download updating data from at least one among the autonomous car and the charging station to update, if needed, its qualification unit, preferably if the qualification device is in its offline configuration, as previously described. The autonomous car then proposes to transfer a number of tokens, preferably based on the quantity of electricity that the autonomous car needs, advantageously based on the amount of electricity still present in the power unit of the first communication device. The autonomous car sends a new receipt, signed only once by itself, to the charging station, said new receipt comprising information about its digital state hash. The charging station adds information about its digital state hash and then counter signs it and sends it to the qualification device, said new receipt is now an at least doubly signed receipt. The qualification device inspects this at least doubly signed receipt and triggers validation conversations with the autonomous car and the charging station, preferably if the qualification device cannot map their claimed digital states, in the form of hashes, to the accumulator and/or the deny list that the qualification device is managing.

Once the tokens transfer has been validated and executed, the amount of electricity corresponding to said number of tokens is transferred from the charging station to the autonomous car. Preferably when the transfer of electricity is finished, the qualification device generates new updating data, signs them, inserts a hash of them into the at least doubly signed receipt, and signs this at least doubly signed receipt which becomes an at least triply signed receipt. Then, the qualification device transmits these updating data and this at least triply signed receipt to the autonomous car and preferably the charging station.

According to an embodiment, the autonomous car and the charging station can send data to the qualification device in any order. As previously mentioned, preferably, the qualification device cannot affix its third signature until it validates all the inputs. However, according to an embodiment, the qualification device can recognize conditions that trigger escalating questions, e.g. challenges for previous at least triply signed receipts and updating data, while it is waiting for an at least doubly signed receipt to be submitted. Advantageously, the qualification device can conduct the reputation process and/or the qualification process with both the first communication device and the second communication device in parallel.

As previously described, the present invention can be applied to a wide range of use cases. These described examples are not a limitation of the present invention.

The invention is not limited to the embodiments described above and extends to all the embodiments covered by the claims.

REFERENCES

100 System
200 Updating data
200a Updating data of the first communication device
200b Updating data of the second communication device
300 At least triply signed receipt
1100 First communication device
1110 Authentication unit of the first communication device
1120 Communication unit of the first communication device
1121 Short-range communication module of the first communication device
1122 Display of the first communication device
1123 Optical reader of the first communication device
1130 Processing unit of the first communication device
1140 Storage unit of the first communication device
1150 Transfer unit of the first communication device
1160 Power unit of the first communication device
1200 Second communication device
1210 Authentication unit of the second communication device
1220 Communication unit of the second communication device
1221 Short-range communication module of the second communication device
1222 Display of the second communication device
1223 Optical reader of the second communication device
1230 Processing unit of the second communication device
1240 Storage unit of the second communication device
1250 Transfer unit of the second communication device
1260 Power unit of the second communication device 1300 Third communication device
2100 First qualification device
2200 Second qualification device
2210 Authentication unit of the second qualification device
2220 Communication unit of the second qualification device
2221 Short-range communication module of the second qualification device
2222 Display of the second qualification device
2223 Optical reader of the second qualification device
2230 Processing unit of the second qualification device
2240 Storage unit of the second qualification device
2250 Qualification unit of the second qualification device
2260 Power unit of the second qualification device
3000 Qualification server
3100 First qualification server
3200 Second qualification server
3300 Third qualification server
4100 First user
4200 Second user
4300 Third user
5000 Digital state hash
5010 List of hashes
5100 Root hash of data
5110 Hash of cluster
5111 Hash of data
5111a Data
5112 Hash of data
5112a Data
5113 Hash of data
5113a Data
5120 Hash of cluster
5121 Hash of data
5121a Data
5130 Hash of cluster
5131 Hash of data
5131a Data
5200 Root hash of at least triply signed receipts
5210 Hash of cluster
5211 Hash of at least triply signed receipt
5211a An at least triply signed receipt
5212 Hash of at least triply signed receipt
5212a An at least triply signed receipt
5220 Hash of cluster
5221 Hash of at least triply signed receipt
5221a An at least triply signed receipt
5222 Hash of at least triply signed receipt
5222a An at least triply signed receipt
5300 Root hash of proof data
5310 Hash of proof data
5310a Proof data
5320 Hash of proof data
5320a Proof data
5330 Hash of proof data
5330a Proof data
5400 Previous digital state hash

The invention claimed is:

1. A system for transferring at least a set of data between at least a first communication device and a second communication device of at least a plurality of communication devices using at least a qualification device, the system comprising a first communication device, a second communication device and a qualification device, and wherein:
 a) each communication device of the plurality of communication devices comprises:
  i) an authentication unit configured to enable authentication of at least a qualification device and at least another communication device of the plurality of communication devices; and
  ii) a communication unit configured to:
   (1) enable a communication with at least a previous qualification device through at least one communication network; and
   (2) enable a communication with at least the qualification device through at least one communication network; and
   (3) enable a communication with at least said another communication device of the plurality of communication devices; and
  iii) a processing unit configured to:
   (1) generate at least one receipt; and
   (2) digitally sign at least one receipt; and
  iv) a storage unit configured to store at least:
   (1) a list of data; and
   (2) a set of data; and
   (3) one previous receipt, at least triply signed, related to a previous data transfer; and
   (4) updating data received from said previous qualification device during at least a previous data transfer and configured to be downloaded by at least the qualification device during at least a data transfer; and
 b) the qualification device comprises:
  i) at least two configurations:
   (1) an online configuration wherein the qualification device is configured to communicate with at least a qualification server and/or with at least another qualification device through at least another communication network; and
   (2) an offline configuration wherein the qualification device is configured to avoid communication with at least said qualification server and/or with said another qualification device through at least said another communication network; and
  ii) an authentication unit configured to enable authentication of at least a first communication device and a second communication device, and to enable authentication of at least said another qualification device; and
  iii) a communication unit configured to:
   (1) enable a communication with at least said first communication device and said second communication device through at least said communication network, when the qualification device is in its online configuration and when the qualification device is in its offline configuration; and
   (2) enable a communication with at least said qualification server and/or with at least said another qualification device through at least said another communication network, when the qualification device is in its online configuration; and
  iv) a qualification unit configured to qualify at least one among data to be transferred, communication devices and a data transfer; and
  v) a storage unit configured to store at least:
   updating data being configured to update said qualification unit; and
  vi) a processing unit configured to:
   (1) update the qualification unit using updating data; and
   (2) verify the consistency of receipts which are at least doubly signed receipts; and (3) qualify at least one among a first communication device and a second communication device, data to be transferred or a data transfer; and (4) digitally sign at least one new receipt, forming a new at least triply signed receipt configured to be at least triply signed; and (5) generate at least new updating data based on at least a data transfer between the first communication device and the second communication device, said updating data being configured to update a qualification unit of at least another qualification device; and (6) insert a reference of said new updating data in said new receipt; and (7) send to the first communication device and to the second communication device at least said new at least triply signed receipt and new updating data;

and wherein said new at least triply signed receipt comprises:

vii) a digital signature of a first communication device; and viii) a digital signature of a second communication device;

ix) a digital signature of a qualification device; and x) data related to digitally signed updating data, said digitally signed updating data being signed by said qualification device; and and wherein:

c) the first communication device, the second communication device and the qualification device are configured to authenticate each other; and d) at least one among the first communication device and the second qualification device is configured to send to the qualification device at least:

i) a list of data related to a set of data to be transferred from the first communication device to the second communication device; and ii) updating data, said updating data coming from the previous qualification device, said updating data being configured to update the qualification unit of the qualification device; and e) the qualification device is configured to use the updating data to update its qualification unit; and f) the qualification device is configured to validate said data transfer by validating, using its qualification unit, at least one among the data to be transferred, the first communication device and the second communication device; and g) the qualification device is configured to authorize the transfer of data from the first communication device to the second communication device, if the qualification unit validates said data transfer; and h) the first communication device is configured to send said set of data to the second communication device; and i) the second communication device is configured to receive and to verify said set of data related to said list of data sent from the first communication device; and j) at least one among the first communication device and the second communication device is configured to generate a new receipt configured to be at least triply signed, to digitally sign it, and to send it to the other communication device among the first communication device and the second communication device; and k) said other communication device among the first communication device and the second communication device is configured to receive said new receipt, to verify it, to digitally sign it, and to send it to the qualification device; and l) The qualification device is configured to receive said new receipt and to verify it; and m) the qualification device is configured to generate new updating data, to sign these new updating data, to insert a reference of said new updating data in said new receipt; and n) the qualification device is configured to send said new updating data to the first communication device and to the second communication device; and o) the qualification device is configured to digitally sign the new receipt, said receipt being at least triply signed, and to send it to the first communication device and to the second communication device; and p) said new at least triply signed receipt comprising:

i) a digital signature of the first communication device; and ii) a digital signature of the second communication device; and iii) a digital signature of the qualification device; and iv) data related to digitally signed new updating data, said new updating data being digitally signed by the qualification device and being configured to update the qualification unit of another qualification device.

2. The system according to claim 1, wherein each communication device of the plurality of communication devices comprises an aggregated digital state stored in its storage unit, said aggregated digital state being generated by forming a tree based on a plurality of calculated hashes and comprising nodes arranged according to a given nodes ordering in the tree, said tree comprising node levels from the leaf nodes, corresponding to the plurality of hashes respectively associated to a plurality of data comprising a digital state of the communication device, to the root node of the tree, every non-leaf node of the tree corresponding to a hash by means of the one-way function of a concatenation of the respective hashes of its child nodes according to a tree concatenation ordering, the root node corresponding to the aggregated digital state hash, which is a hash by means of the one-way function of a concatenation of the hashes of the nodes of a penultimate nodes level in the tree according to said tree concatenation ordering, and wherein each communication device of the plurality of communication devices is configured to send said aggregated digital state hash to the qualification device.

3. The system according to claim 2, wherein the aggregated digital state of a given communication device of the plurality of communication devices is modified each time said given communication device realizes a data transfer according to the following scheme:

a) when the given communication device sends data, at least a leaf node of the tree is removed, said leaf node corresponding to said transferred data; and b) when the given communication device receives data, at least a leaf node of the tree is added, said leaf node corresponding to said transferred data.

4. The system according to claim 1, wherein each communication device of the plurality of communication devices comprises an aggregated digital state stored in its storage unit, and wherein each communication device of the plurality of communication devices is configured to send a hash of said aggregated digital state to the qualification device, said aggregated digital state hash being the hash of the root of a tree, said tree being based on a plurality of trees, said plurality of trees comprising at least: a) a first tree, said first tree being built using a first tree-building algorithm A1 programmed in the processing unit of each communication device, said first tree comprising: i) a leaves level, each leaf of said leaves level comprising data to be transferred; and ii) a first nodes level, each node of said first nodes level comprising a hash of the data of the leaves level; and b) a second tree, said second tree being built using a second tree-building algorithm A2 programmed in the processing unit of each communication device, said second tree comprising: i) a leaves level, each leaf of said leaves level comprising an at least triply signed receipt; and ii) a first nodes level, each node of said first nodes level comprising a hash of an at least triply signed receipt of the leaves level; and c) a third tree, said third tree being built using a third tree-building algorithm A3 programmed in the processing unit of each communication device, said third tree comprising: i) a leaves level, each leaf of said leaves level comprising a qualification proof data; and ii) a first nodes level, each node of said first nodes level comprising a hash of a qualification proof data of the leaves level; and d) a branch comprising at least one previous aggregated digital state hash.

5. The system according to claim 1, wherein the qualification unit comprises at least one accumulator storing aggregated digital state hashes of at least a part of the communication devices of the plurality of communication devices, said accumulator being configured to allow a communication device's aggregated digital state hash to be updated only if the new aggregated digital state hash of said communication device evolves from an aggregated digital state hash of said communication device that is currently stored in said accumulator.

6. The system according to claim 5, wherein the updating data comprise an updated accumulator.

7. The system according to claim 2, wherein the qualification unit comprises at least one filter comprising a list of previous aggregated digital state hashes and being configured to check if an aggregated digital state hash is comprised by said list of previous aggregated digital states hashes.

8. The system according to claim 1, wherein the qualification unit comprises a reputation processing module configured to evaluate a reputation of at least one communication device of the plurality of communication devices using a reputation algorithm, said reputation algorithm comprising an artificial intelligence algorithm based on a plurality of parameters taken among at least location of the qualification device, location of the communication devices, time of the data transfer, nature of the data to be transferred, quantity of the data to be transferred.

9. A communication device for transferring data to another communication device using a first qualification device and a second qualification device, said communication device comprising: a) an authentication unit configured to enable authentication of at least said second qualification device and at least said another communication device; and b) a communication unit configured to: i) enable a communication with at least said first qualification device through at least one communication network; and ii) enable a communication with at least said second qualification device through at least one communication network; and iii) enable a communication with at least said another communication device; and c) a processing unit configured to: i) generate at least a new receipt; and ii) digitally sign at least one receipt; and d) a storage unit configured to store at least: i) a list of data; and ii) a set of data; and iii) one previous receipt, at least triply signed, related to a previous data transfer; and iv) updating data received from the first qualification device during at least a previous data transfer and configured to be downloaded by at least the second qualification device during at least a data transfer; and wherein the communication device is configured to: e) authenticate said another communication device and said second qualification device; and f) submit to said second qualification device at least: i) a list of data related to a set of data to be transferred from the communication device to said another communication device and/or from said another communication device to the communication device; and ii) updating data, said updating data coming from said first qualification device, said updating data being configured to update the second qualification device; and g) be qualified by at least said second qualification device; and h) send to said another communication device said set of data and/or receive from said another communication device said set of data; and i) generate a new receipt configured to be at least triply signed, to digitally sign it, and to send it to said another communication device; and j) receive from said second qualification device said new receipt digitally signed by said second qualification device and by said another communication device, said new receipt being a new at least triply signed receipt; k) receive from said second qualification device new updating data being configured to update another qualification device; and wherein said new at least triply signed receipt comprises: i) a digital signature of the communication device; ii) a digital signature of said another communication device; iii) a digital signature of said second qualification device; iv) data related to digitally signed new updating data, said new updating data being digitally signed by said second qualification device.

10. A qualification device configured to validate a transfer of data between at least a first communication device and a second communication device, and comprising:
 a) at least two configurations:
  i) an online configuration wherein the qualification device is configured to communicate with at least a qualification server and/or with at least one another qualification device through at least a communication network; and
  ii) an offline configuration wherein the qualification device is configured to avoid communication with at least said qualification server and/or said with at least another qualification device through at least said communication network; and
 b) an authentication unit configured to enable authentication of at least a first communication device and a second communication device and to enable authentication of at least said another qualification device and/or at least said qualification server; and
 c) a communication unit configured to:
  i) enable a communication with at least said first communication device and said second communication device through at least a communication network, when the qualification device is in its online configuration and/or when the qualification device is in its offline configuration; and
  ii) enable a communication with at least said qualification server and/or with at least said another qualification device through at least another communication network, when the qualification device is in its online configuration;
 d) a qualification unit configured to qualify at least one among the data to be transferred, the first communication device and the second communication device, and the data transfer; and
 e) a storage unit configured to store at least:

i) updating data being configured to update said qualification unit; and f) a processing unit configured to:
 i) update the qualification unit using updating data; and
 ii) verify the consistency of receipts, which are at least doubly signed receipts; and
 iii) qualify at least one among the first communication device and the second communication device, the data to be transferred and the data transfer; and
 iv) digitally sign at least one new receipt, forming a new receipt at least triply signed; and
 v) generate at least new updating data based on at least a data transfer between the first communication device and the second communication device, said updating data being configured to update a qualification unit of at least another qualification device; and
 vi) insert a reference of said new updating data in said new receipt; and
 vii) send to the first communication device and to the second communication device at least said new at least triply signed receipt and new updating data;

said qualification device being configured to:

g) authenticate at least the first communication device and the second communication device;

h) receive, from at least one among the first communication device and the second communication device, at least:
 i) a list of data related to a set of data to be transferred from the first communication device to the second communication device and/or a list of data related to a set of data to be transferred from the second communication device to the first communication device;
 ii) updating data, said updating data coming from a previous qualification device, said updating data being configured to update the qualification unit of the qualification device; and i) use the updating data to update its qualification unit; and j) validate said data transfer by validating, using its qualification unit, at least one among the data to be transferred, the first communication device and the second communication device; and k) authorize the transfer of data from the first communication device to the second communication device and/or from the second communication device to the first communication device-, if the qualification unit validates said data transfer; and l) Receive a new receipt, configured to be triply signed, from at least one among the first communication device and the second communication device; and m) verify the new receipt and, if said new receipt comprises a digital signature of the first communication device and a digital signature of the second communication device, to generate new updating data based on at least a data transfer between the first communication device and the second communication device, to sign said new updating data and to insert a reference of said new updating data in said new receipt; and n) send said new updating data to the first communication device and to the second communication device; and o) digitally sign the new receipt forming a new at least triply signed receipt, and to send it to the first communication device and to the second communication device; and p) store the new at least triply signed receipt and said updating data in its storage unit;

said new at least triply signed receipt comprising:
 i) a digital signature of the first communication device; and
 ii) a digital signature of the second communication device; and
 iii) a digital signature of the qualification device; and
 iv) data related to digitally signed new updating data, said new updating data being digitally signed by the qualification device and being configured to update the qualification unit of another qualification device.

11. The qualification device according to claim 10, wherein the communication unit comprises a short-range communication module comprising at least one antenna, configured to enable a short-range communication with respectively the first communication device and/or with the second communication device, when the distance between the short-range communication module and respectively the first communication device and/or the second communication device is lower than 10 meters, preferably than 5 meters and advantageously than 25 centimeters.

12. A method for transferring at least a set of data between at least a first communication device and a second communication device taken among a plurality of communication devices using at least a first qualification device and a second qualification device taken among a plurality of qualification devices, wherein: a) each communication device of the plurality of communication devices comprises: i) an authentication unit configured to enable authentication of at least a first qualification device, a second qualification device and at least another communication device of the plurality of communication devices; and ii) a communication unit configured to: (1) enable a communication with at least said first qualification device through at least one communication network; and (2) enable a communication with at least said second qualification device through at least one communication network; and (3) enable a communication with at least another communication device of the plurality of communication devices; and iii) a processing unit configured to: (1) generate at least one receipt; and (2) digitally sign at least one receipt; and iv) a storage unit configured to store at least: (1) a list of data; and (2) a set of data; and (3) one previous receipt, at least triply signed, related to a previous data transfer; and (4) updating data received from said first qualification device during at least a previous data transfer and configured to be downloaded by at least second qualification device during at least a data transfer; and b) each qualification device of the plurality of qualification devices comprises: i) at least two configurations: (1) an online configuration wherein the qualification device is configured to communicate with at least a qualification server and/or with at least one another qualification device through at least another communication network; and (2) an offline configuration wherein the qualification device is configured to avoid communication with at least said qualification server and/or with at least said another qualification device through at least another communication network; and ii) an authentication unit configured to enable authentication of at least a first communication device and a second communication device, and to enable authentication of at least said another qualification device; and iii) a communication unit configured to: (1) enable a communication with at least said first communication device and said second communication device through at least said communication network, when the qualification device is in its online configuration and when the qualification device is in its offline configuration; and (2) enable a communication with at least said qualification server and/or with at least said another qualification device through at least said communication network, preferably through at least a long range communication network, when the qualification device is in its online configuration; and iv) a qualification unit configured to qualify at least one among the data to be transferred, the communication devices and data transfers; and v) a storage unit configured to store at least: (1) updating data being configured to update said qualification unit; and vi) a processing unit configured to: (1) update the qualification unit using updating data; and (2) verify the consistency of receipts, which are at least doubly signed receipts; (3) qualify at least one among the first communication device and the second communication device, data to be transferred and the data transfer; and (4) digitally sign at least one new receipt forming a new at least triply signed receipt; and (5) generate at least new updating data based on at least a data transfer between the first communication device and the second communication device, said updating data being configured to update a qualification unit of at least another qualification device; and (6) insert a reference of said new updating data in said new receipt; and (7) send to the first communication device and to the second communication device at least said new at least triply signed receipt and new updating data; and wherein said new at least triply signed receipt comprises: vii) a digital signature of a first communication device; viii) a digital signature of a second communication device; ix) a digital signature of a qualification device; x) data related to digitally signed updating data, said digitally signed updating data being signed by said qualification device; and wherein: c) the first communication device, the second communication device and the second qualification device authenticate each other; d) at least one among the first communication device and the second communication device sends to the second qualification device at least: i) a list of data related to a set of data to be transferred from the first communication device to the second communication device; and ii) updating data, said updating data coming from the first qualification device, said updating data being configured to update the qualification unit of the second qualification device; and e) the second qualification device uses the updating data to update its qualification unit; and f) the second qualification device validates said data transfer by validating, using its qualification unit, at least one among the data to be transferred, the first communication device and the second communication device; and g) the second qualification device authorizes the transfer of data from the first communication device to the second communication device, if the qualification unit validates said data transfer; and h) the first communication device sends said set of data to the second communication device; and i) the second communication device receives and verifies said set of data related to said list of data from the first communication device; and j) at least one among the first communication device and the second communication device generates a new receipt configured to be triply signed, digitally signs it, and sends it to the other communication device of at least one among the first communication device and the second communication device; and k) said other communication device of at least one among the first communication device and the second communication device receives said new receipt, verifies it, digitally signs it, and sends it to the qualification device; and l) the second qualification device receives said new receipt and verifies it; and m) the second qualification device generates new updating data, sign these new updating data, inserts a reference of said new updating data in said new receipt; and n) the second qualification device sends said new updating data to the first communication device and to the second communication device; and o) the second qualification device digitally signs the new receipt forming a new at least triply signed receipt, and sends it to the first communication device and to the second communication device; and p) said new at least triply signed receipt comprising: i) a digital signature of the first communication device; and ii) a digital signature of the second communication device; and iii) a digital signature of the second qualification device; and iv) data related to digitally signed new updating data, said new updating data being digitally signed by the qualification device and being configured to update the qualification unit of another qualification device.

13. The method according to claim 12, wherein each of the first communication device and the second communication device comprises an aggregated digital state hash stored in its storage unit, said aggregated digital state hash being the hash of the root of a tree, said tree being generated by its processing unit, said generation of said tree comprising the following steps:
  a) generating a first tree, said first tree being generating by the processing unit using a first tree-building algorithm A1 programmed in the processing unit:
    i) said first tree comprising:
      (1) a leaves level, each leaf of said leaves level comprising data; and
      (2) a first nodes level, each node of said first nodes level comprising a hash of the data of the leaves level; and
    ii) said first tree-building algorithm A1 executing the following steps:
      (1) collecting a plurality of data forming the leaves level; and
      (2) hashing at least one data using a first one-way function programmed in the processing unit, in order to get a root hash of the first tree; and
  b) generating a second tree, said second tree being built using a second tree-building algorithm A2 programmed in the processing unit:
    i) said second tree comprising:
      (1) a leaves level, each leaf of said leaves level comprising an at least triply signed receipt; and
      (2) a first nodes level, each node of said first nodes level comprising a hash of an at least triply signed receipt of the leaves level; and
    ii) said second tree-building algorithm A2 executing the following steps:
      (1) collecting a plurality of at least triply signed receipts forming the leaves level; and
      (2) hashing at least one at least triply signed receipt using a second one-way function programmed in the processing unit, to get a root hash of the second tree; and
  c) generating a third tree, said third tree being built using a third tree-building algorithm A3 programmed in the processing unit:
    i) said third tree comprising:
      (1) a leaves level, each leaf of said leaves level comprising a qualification proof data; and
      (2) a first nodes level, each node of said first nodes level comprising a hash of a qualification proof data of the leaves level; and
    ii) said third tree-building algorithm A3 executing the following steps:
      (1) collecting a plurality of qualification proof data forming the leaves level; and (2) hashing at least one qualification proof data using a third one-way function programmed in the processing unit, to get a root hash of the third tree; and d) generating a branch comprising at least one previous aggregated digital state hash;

e) generating a root hash of the tree using a one-way function programmed in the processing unit based on the root of the first tree, on the root of the second tree, on the root on the third tree and on the previous aggregated digital state hash.

14. The method according to claim 12, wherein the step of validating, by the second qualification device, the qualification of a communication device taken among at least the first communication device and the second communication device comprises at least the following steps:

a) receiving by the second qualification device from a communication device an aggregated digital state hash; and b) verifying by the qualification unit of the second qualification device that said aggregated digital state hash belongs to and/or is described by at least one accumulator stored by the storage unit of the second qualification device:

i) If the aggregated digital state hash does not belong to said accumulator:
(1) the second qualification device invites the communication device to produce a sequence of data that demonstrates that said aggregated digital state hash is based on an aggregated digital state belonging to said accumulator; and
(2) If the communication device does not provide the second qualification device with said sequence of data, the transfer of data between said communication device and another communication device is cancelled;

ii) If the communication device provides the qualification device with said sequence of data or if the aggregated digital state belongs to said accumulator:
(1) the qualification unit of the second qualification device checks if said aggregated digital state hash is listed in a list of previous aggregated digital state hashes and/or in a deny list of previously unauthorized digital state hashes and/or of unauthorized communication devices, stored in the storage unit of the qualification device:
(a) if said aggregated digital state hash is listed in said previous list and/or deny list, then the data transfer is cancelled;
(b) if the aggregated digital state hash is not listed in said list of previous aggregated digital state hashes or if the aggregated digital state hash is not listed in said deny list, the qualification unit validates the communication device.

15. A method for updating a qualification unit of a qualification device according to claim 10 based on updating data carried by a communication device comprising a) an authentication unit configured to enable authentication of at least said second qualification device and at least said another communication device; and b) a communication unit configured to: i) enable a communication with at least said first qualification device through at least one communication network; and ii) enable a communication with at least said second qualification device through at least one communication network; and iii) enable a communication with at least said another communication device; and c) a processing unit configured to: i) generate at least a new receipt; and ii) digitally sign at least one receipt; and d) a storage unit configured to store at least: i) a list of data; and ii) a set of data; and iii) one previous receipt, at least triply signed, related to a previous data transfer; and iv) updating data received from the first qualification device during at least a previous data transfer and configured to be downloaded by at least the second qualification device during at least a data transfer; and wherein the communication device is configured to: e) authenticate said another communication device and said second qualification device; and f) submit to said second qualification device at least: i) a list of data related to a set of data to be transferred from the communication device to said another communication device and/or from said another communication device to the communication device; and ii) updating data, said updating data coming from said first qualification device, said updating data being configured to update the second qualification device; and g) be qualified by at least said second qualification device; and h) send to said another communication device said set of data and/or receive from said another communication device said set of data; and i) generate a new receipt configured to be at least triply signed, to digitally sign it, and to send it to said another communication device; and j) receive from said second qualification device said new receipt digitally signed by said second qualification device and by said another communication device, said new receipt being a new at least triply signed receipt; k) receive from said second qualification device new updating data being configured to update another qualification device; and wherein said new at least triply signed receipt comprises: i) a digital signature of the communication device; ii) a digital signature of said another communication device; iii) a digital signature of said second qualification device; data related to digitally signed new updating data, said new updating data being digitally signed by said second qualification device, and the updating data coming from another qualification device, said method comprising the following steps: a) receiving by the communication device updating data from said another qualification device; and b) sending by the communication device said updating data to the qualification device; and c) receiving by the qualification device said updating data from the communication device; and d) updating the qualification unit of the qualification device by a processing unit of the qualification device using said updating data.

* * * * *